(12) United States Patent
Jeon et al.

(10) Patent No.: US 12,401,113 B2
(45) Date of Patent: Aug. 26, 2025

(54) ANTENNA AND ELECTRONIC DEVICE INCLUDING THE SAME

(71) Applicant: Samsung Electronics Co., Ltd., Suwon-si (KR)

(72) Inventors: Seunggil Jeon, Suwon-si (KR); Namwoo Kim, Suwon-si (KR); Seongbeom Hong, Suwon-si (KR); Kyunghoon Moon, Suwon-si (KR); Yunbum Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/470,038

(22) Filed: Sep. 19, 2023

(65) Prior Publication Data

US 2024/0014544 A1    Jan. 11, 2024

Related U.S. Application Data

(63) Continuation of application No. 16/866,011, filed on May 4, 2020, now Pat. No. 11,777,193.

(30) Foreign Application Priority Data

May 14, 2019  (KR) .................. 10-2019-0056592
Mar. 13, 2020  (KR) .................. 10-2020-0031173

(51) Int. Cl.
*H01Q 1/22*    (2006.01)
*H01Q 1/24*    (2006.01)
(Continued)

(52) U.S. Cl.
CPC .......... *H01Q 1/243* (2013.01); *H01Q 21/065* (2013.01); *H04M 1/0266* (2013.01); *H04M 1/0277* (2013.01)

(58) Field of Classification Search
CPC ........ H01Q 1/243; H01Q 21/065; H01Q 1/12; H01Q 1/42; H01Q 9/0407; H01Q 21/08;
(Continued)

(56) References Cited

U.S. PATENT DOCUMENTS

| 11,264,734 B2 | 3/2022 | Lee et al. |
| 2004/0051670 A1 | 3/2004 | Sato |

(Continued)

FOREIGN PATENT DOCUMENTS

| CN | 101911379 A | 12/2010 |
| CN | 108631039 A | 10/2018 |

(Continued)

OTHER PUBLICATIONS

Brazilian Notice of Allowance dated Sep. 18, 2023, issued in Brazilian application No. 12 2022 007185 6.
(Continued)

*Primary Examiner* — Dimary S Lopez Cruz
*Assistant Examiner* — Bamidele A Immanuel
(74) *Attorney, Agent, or Firm* — Jefferson IP Law, LLP

(57) ABSTRACT

An electronic device is provided. The electronic device includes a front cover, a rear cover, an array antenna, and a support member. The support member includes a conductive first portion forming a lateral appearance of the electronic device, a second portion adjacent to the array antenna, the front cover, and the conductive first portion, and having at least one opening filled with a non-conductive material, and a third portion including a non-conductive material and disposed adjacent to the array antenna, the rear cover, and the conductive first portion. The conductive first portion is exposed to an outside of the electronic device, and the second and third portions are hidden by the front and rear (Continued)

covers. A beam formed by the array antenna is radiated to the outside through the at least one opening and the third portion.

19 Claims, 32 Drawing Sheets

(51) Int. Cl.
*H01Q 21/06* (2006.01)
*H04M 1/02* (2006.01)

(58) Field of Classification Search
CPC ....... H01Q 1/22; H01Q 1/241; H04M 1/0266; H04M 1/0277; H04M 1/026
See application file for complete search history.

(56) References Cited

U.S. PATENT DOCUMENTS

| | | | |
|---|---|---|---|
| 2009/0174612 A1 | 7/2009 | Ayala et al. | |
| 2009/0262029 A1 | 10/2009 | Chiang et al. | |
| 2012/0034954 A1 | 2/2012 | Tabe | |
| 2013/0027892 A1* | 1/2013 | Lim ................. | H04M 1/185 361/679.01 |
| 2014/0232607 A1* | 8/2014 | Lee .................. | H04B 15/04 343/841 |
| 2015/0155614 A1* | 6/2015 | Youn ................. | H04M 1/0202 343/702 |
| 2016/0351996 A1 | 12/2016 | Ou | |
| 2016/0351998 A1 | 12/2016 | Ahn et al. | |
| 2017/0133748 A1* | 5/2017 | Kim .................. | H01Q 9/42 |
| 2017/0135239 A1 | 5/2017 | Hyun et al. | |
| 2017/0207516 A1 | 7/2017 | Koo et al. | |
| 2017/0263998 A1 | 9/2017 | Park et al. | |
| 2017/0365911 A1 | 12/2017 | Zachara et al. | |
| 2018/0241115 A1* | 8/2018 | Cho ................... | H01Q 1/36 |
| 2018/0269561 A1 | 9/2018 | Kim et al. | |
| 2018/0277929 A1 | 9/2018 | Seo et al. | |
| 2018/0331418 A1* | 11/2018 | Kim .................. | H01Q 1/243 |
| 2018/0366813 A1 | 12/2018 | Kim et al. | |
| 2019/0027807 A1* | 1/2019 | Choi ................. | H01Q 5/378 |
| 2019/0104212 A1 | 4/2019 | Lee et al. | |
| 2019/0115648 A1 | 4/2019 | Subba et al. | |
| 2019/0121396 A1 | 4/2019 | Ha et al. | |
| 2019/0132973 A1* | 5/2019 | Lee .................. | G06F 1/1637 |
| 2019/0165470 A1 | 5/2019 | Jeon | |
| 2019/0165473 A1 | 5/2019 | Yun et al. | |
| 2019/0257933 A1 | 8/2019 | Nath et al. | |
| 2019/0267718 A1 | 8/2019 | Rajagopalan et al. | |
| 2019/0305405 A1 | 10/2019 | Im et al. | |
| 2020/0153115 A1* | 5/2020 | Yun .................. | H01Q 1/2283 |
| 2020/0203804 A1* | 6/2020 | Khripkov .......... | H01Q 1/243 |
| 2020/0259251 A1* | 8/2020 | Seo .................. | H01Q 21/061 |
| 2020/0266521 A1 | 8/2020 | Jeong et al. | |
| 2020/0266522 A1* | 8/2020 | Moon ............... | H04M 1/026 |
| 2020/0358203 A1* | 11/2020 | Park ................. | H01Q 1/243 |
| 2020/0365972 A1* | 11/2020 | Jeon ................. | H01Q 21/08 |
| 2021/0218128 A1* | 7/2021 | Lee .................. | H01Q 21/062 |
| 2021/0280971 A1* | 9/2021 | Kim ................. | H01Q 1/243 |
| 2021/0328362 A1* | 10/2021 | Park ................. | H01Q 19/06 |
| 2022/0094067 A1* | 3/2022 | Rupakula ......... | H01Q 1/40 |
| 2022/0102869 A1* | 3/2022 | Park ................. | H01Q 1/243 |

FOREIGN PATENT DOCUMENTS

| | | |
|---|---|---|
| CN | 108633199 A | 10/2018 |
| CN | 111564691 A | 8/2020 |
| EP | 2 110 882 A1 | 10/2009 |
| EP | 3 098 902 A | 11/2016 |
| EP | 3 696 912 A1 | 8/2020 |
| KR | 10-2020-0099813 A | 8/2020 |
| RU | 2 265 264 C2 | 11/2005 |

OTHER PUBLICATIONS

Russian Office Action dated Oct. 17, 2023, issued in Russian Patent Application No. 021132953.
International Search Report with Written Opinion dated Aug. 13, 2020; International Appln. No. PCT/KR2020/005858.
U.S. Notice of Allowance dated Jul. 14, 2020; U.S. Appl. No. 16/884,713.
European Search Report dated Mar. 16, 2021; European Appln. No. 20729607.0-1205 / 3756240 PCT/KR2020005858.
Australian Office Action dated Mar. 22, 2021; Australian Appln. No. 2020204043.
Chinese Office Action with English translation dated Nov. 26, 2021; Chinese Appln. No. 202080003642.0.
Brazilian Notice of Allowance dated Oct. 25, 2022, issued in Brazilian application No. 11 2021 022807 1.
Chinese Office Action dated Nov. 10, 2022, issued in Chinese Application No. 202080003642.0.
Korean Notice of Allowance dated Jan. 2, 2024, issued in Korean Patent Application No. 10-2020-0031173.
Russian Decision on Grant dated Jan. 23, 2024, issued in Russian Patent Application No. 2021132953.
Korean Notice of Allowance dated Sep. 2, 2024, issued in Korean Patent Application No. 10-2020-0062158.
Malaysian Office Action dated Dec. 2, 2024; Malaysian Appln. No. PI2021006652.

* cited by examiner

ANTENNA AND ELECTRONIC DEVICE INCLUDING THE SAME

CROSS-REFERENCE TO RELATED APPLICATION(S)

This application is a continuation application of prior application Ser. No. 16/866,011, filed on May 4, 2020, which claimed priority under 35 U.S.C. 119(a) of a Korean patent application number 10-2019-0056592 filed on May 14, 2019, in the Korean Intellectual Property Office, and of a Korean patent application number 10-2020-0031173, filed on Mar. 13, 2020, in the Korean Intellectual Property Office, the disclosures of each of which are incorporated by reference herein in their entireties.

BACKGROUND

1. Field

The disclosure relates to an antenna and an electronic device including the same.

2. Description of Related Art

With the development of wireless communication technology, electronic devices (e.g., communication electronic devices) are commonly used in daily life; thus, use of content is increasing exponentially. Because of such rapid increase in the use of content, a network capacity is reaching its limit. After commercialization of 4th generation (4G) communication systems, in order to meet growing wireless data traffic demand, a communication system (e.g., 5th generation (5G) or pre-5G communication system, or new radio (NR))) that transmits and/or receives signals using a frequency of a high frequency (e.g., millimeter wave (mm-Wave)) band (e.g., 3 GHz to 300 GHz band) is being studied.

Next-generation wireless communication technologies are currently developed to permit signal transmission/reception using frequencies in the range of 3 GHz to 100 GHz, overcome a high free space loss due to frequency characteristics, implement an efficient mounting structure for increasing an antenna gain, and realize a related new antenna module. This antenna module may include an array-type antenna module in which various numbers of antenna elements (e.g., conductive patches) are arranged at regular intervals. These antenna elements may be disposed in an electronic device so as to form a beam pattern in one direction, for example, toward a front, rear, or lateral surface of the electronic device from an inner space of the electronic device.

The electronic device may include a conductive portion (e.g., a metal member) disposed on at least a part of a housing to reinforce the rigidity and create a beautiful appearance, and a non-conductive portion (e.g., a polymer member) combined with the conductive portion. However, when the conductive portion is placed near the antenna module disposed inside the electronic device, the radiation performance and radiation sensitivity of the antenna module may be deteriorated.

The non-conductive portion may be insert-injected into or structurally combined with the conductive portion to form a single housing. Further, in order to prevent the conductive portion and the non-conductive portion from being separated by an external impact, a boundary region between the conductive portion and the non-conductive portion may have an engaging structure composed of at least one protrusion and at least one recess for receiving the at least one protrusion. A portion of the housing faced by the antenna module that forms a beam pattern in a specific direction from the inner space of the electronic device may be formed as the non-conductive portion. Thus, the boundary region between the conductive portion and the non-conductive portion may be placed near the antenna module, and a concave part of the conductive portion produced by the engaging structure composed of the protrusion and the recess may also be placed near the antenna module.

Unfortunately, this concave part may cause an excitation current, so that the antenna module may be confronted with the degradation of radiation performance and radiation sensitivity.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an antenna and an electronic device including the same.

Another aspect of the disclosure is to provide an apparatus and method for an electronic device capable of preventing the degradation of antenna radiation performance through a structural modification of a housing.

Another aspect of the disclosure is to provide an apparatus and method for an electronic device capable of preventing the damage of a housing due to an external impact and also preventing the degradation of antenna performance.

Additional aspects will be set forth in part in the description which follows and, in part, will be apparent from the description, or may be learned by practice of the presented embodiments.

In accordance with an aspect of the disclosure, an electronic device is provided. The electronic device includes a front cover, a rear cover, an array antenna, and a support member. The front cover and the rear cover form a part of an outer appearance of the electronic device. The array antenna includes a plurality of antenna elements disposed between the front cover and the rear cover. The support member is disposed between the front cover and the rear cover, and is configured to support a display of the electronic device and extend to a lateral surface of the electronic device to form at least in part a lateral appearance of the electronic device. The support member includes a conductive first portion forming the lateral appearance of the electronic device, a second portion adjacent to the array antenna, the front cover, and the conductive first portion, and having at least one opening filled with a non-conductive material, and a third portion formed of a non-conductive material and adjacent to the array antenna, the rear cover, and the conductive first portion. The first portion is exposed to an outside of the electronic device, and the second and third portions are hidden by the front and rear covers so as not to be exposed to the outside. A beam formed by the array antenna is radiated to the outside through the at least one opening and the third portion.

In accordance with another aspect of the disclosure, a portable communication device is provided. The portable communication device includes a housing, a display, and an antenna module. The housing includes a first member forming a front portion of the portable communication device, a second member forming a rear portion of the portable communication device, and a third member forming a lateral portion of the portable communication device. The third member includes a conductive member having an opening formed therein, and a non-conductive member filled in the opening. One surface of the conductive member is exposed to an outside of the portable communication device, and the non-conductive member is disposed in the housing so as not to be exposed to the outside. The display is disposed under the first member and visually seen to the outside through the first member. The antenna module is disposed between the display and the second member and include an antenna and a printed circuit board. The antenna is formed on the printed circuit board such that a signal radiated from the antenna is transmitted to the outside through the non-conductive member.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
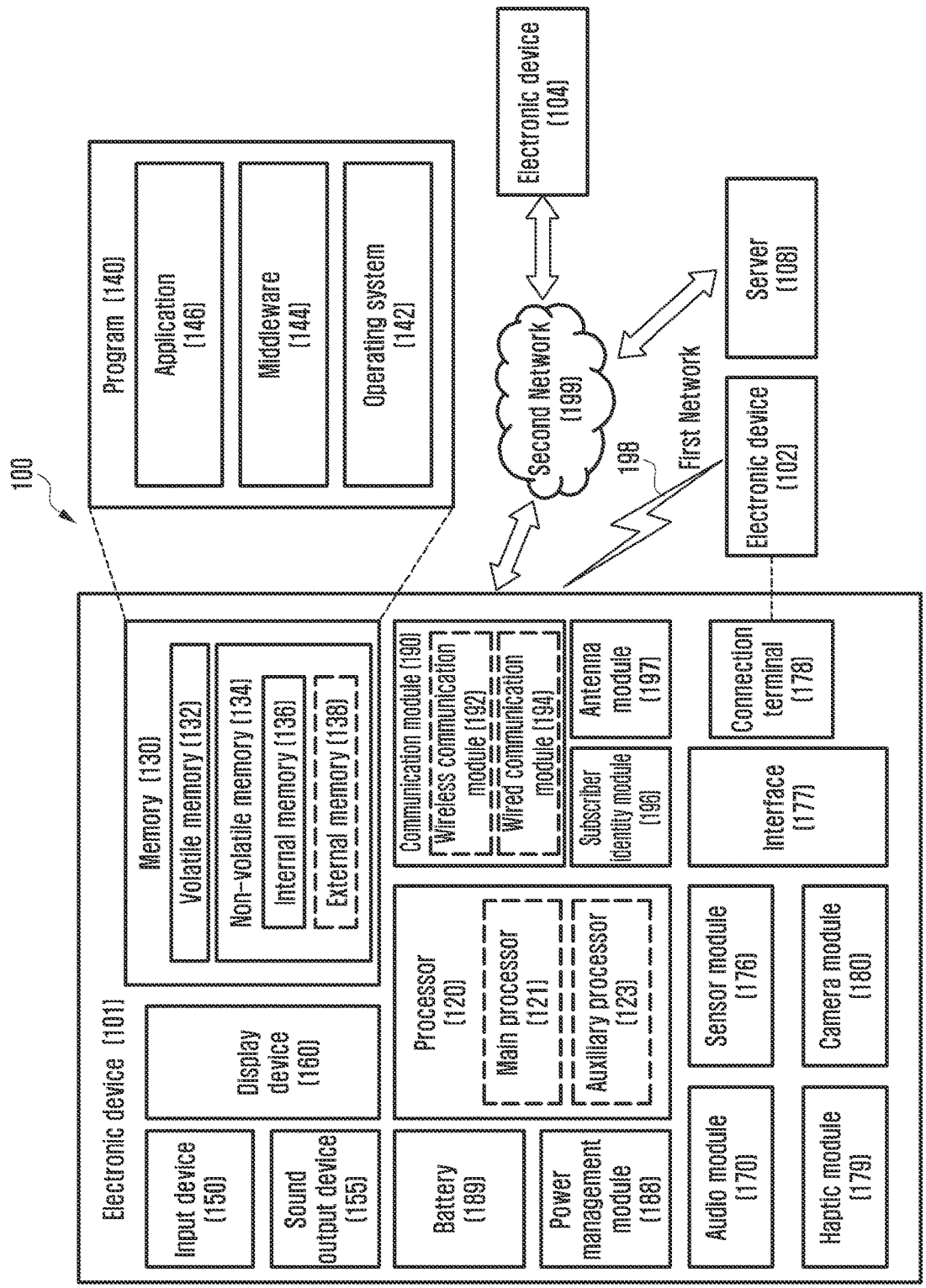
FIG. 1 is a block diagram illustrating an electronic device in a network environment according to an embodiment of the disclosure.

It is to be understood that the singular forms "a," "an," and "the" include plural referents unless the context clearly dictates otherwise. Thus, for example, reference to "a component surface" includes reference to one or more of such surfaces. FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134, and the non-volatile memory may include one or more of an internal memory 136 and external memory 138.

The program 140 may be stored in the memory 130 as software, and may include, for example, an operating system (OS) 142, middleware 144, and/or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases.

As used herein, such terms as "1st" and "$2^{nd}$," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
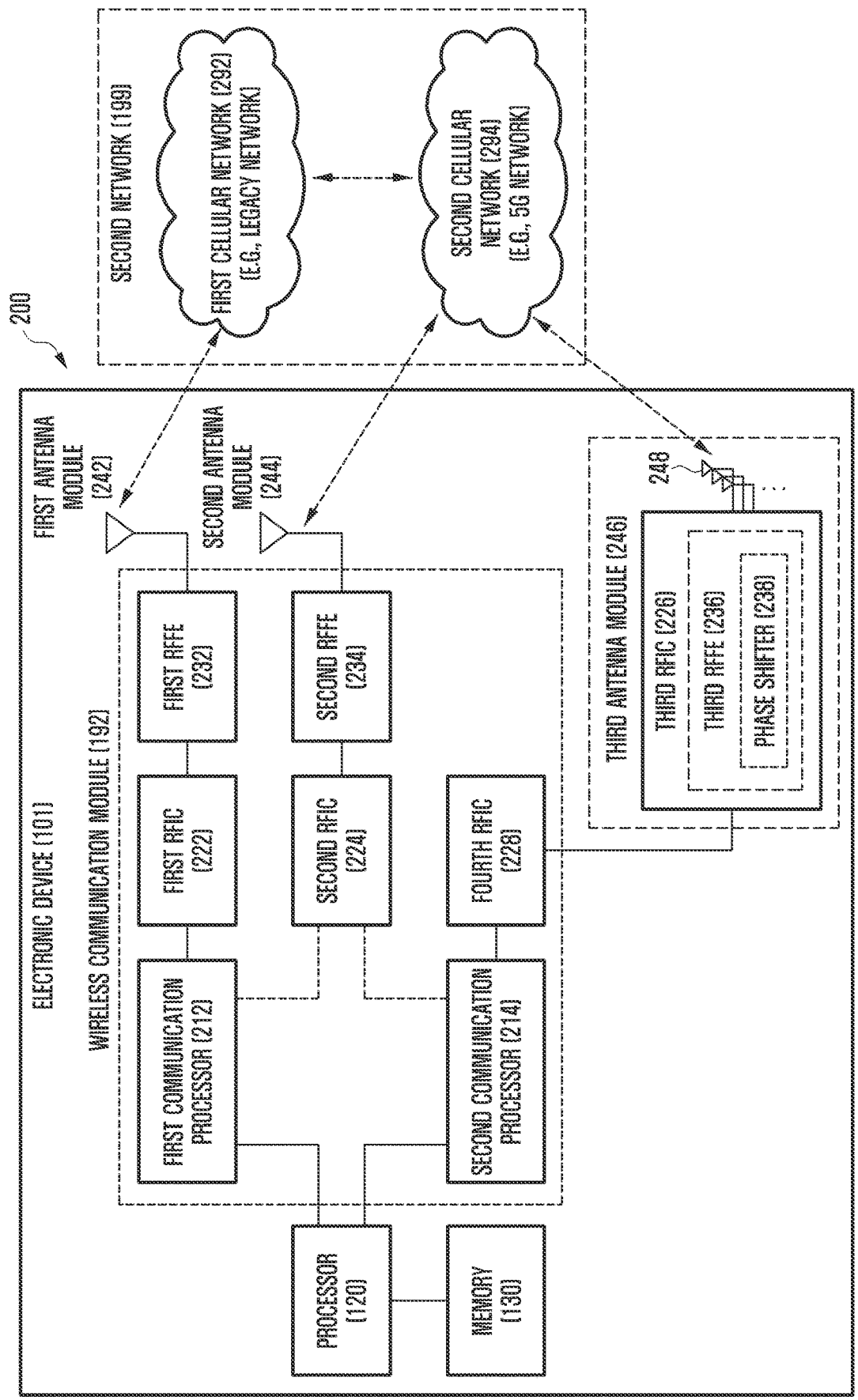
FIG. 2 is a block diagram illustrating an electronic device for supporting a legacy network communication and a 5G network communication according to an embodiment of the disclosure.

FIG. 2 is a block diagram illustrating an electronic device in a network environment including a plurality of cellular networks according to an embodiment of the disclosure.

Referring to FIG. 2, the electronic device 101 of block diagram 200 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include the processor 120 and the memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long-term evolution (LTE) network. The second communication processor 214 may establish a communication channel corresponding to a designated band (e.g., about 6 GHz to about GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through a third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
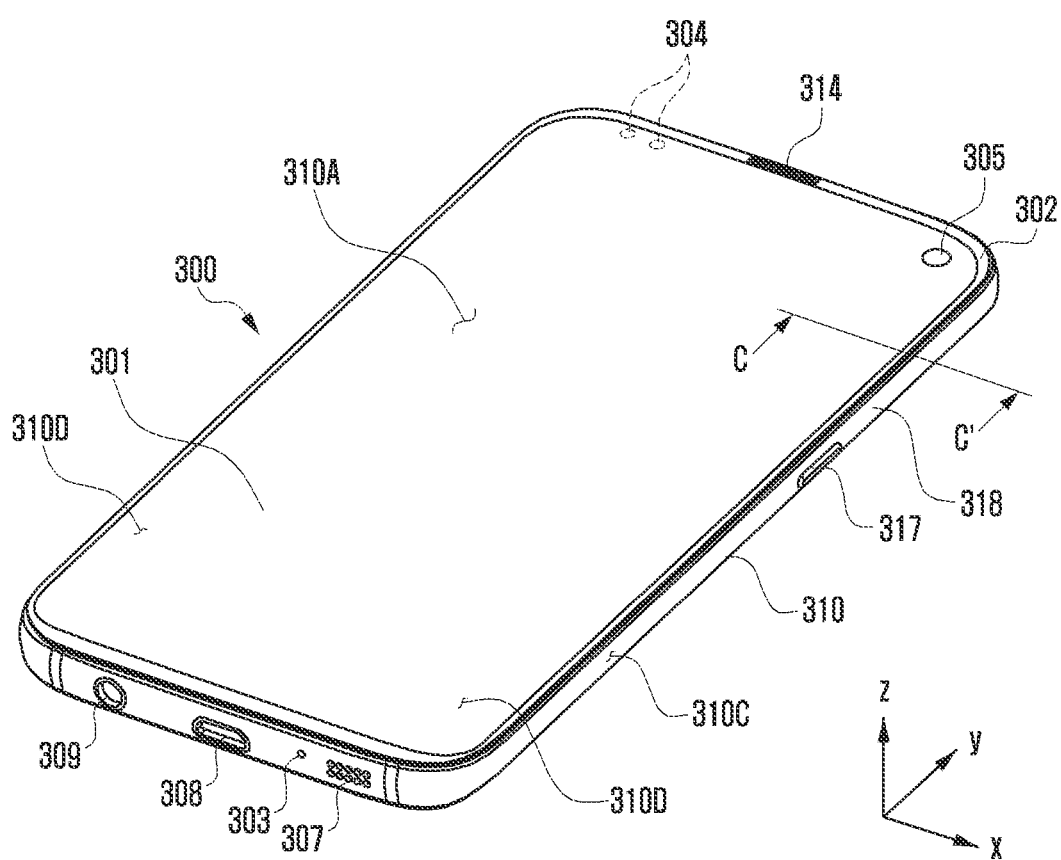
FIG. 3A is a perspective view showing a front surface of a mobile electronic device according to an embodiment of the disclosure.

FIG. 3A illustrates a perspective view showing a front surface of a mobile electronic device according to an embodiment of the disclosure.

Figure 3B:
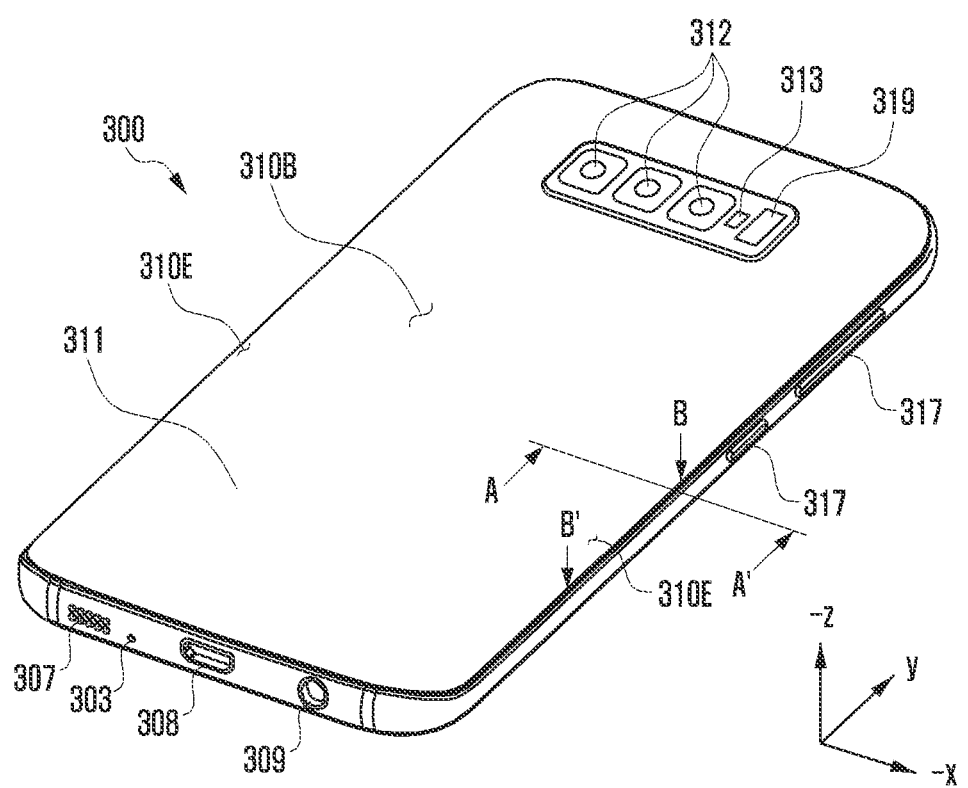
FIG. 3B is a perspective view showing a rear surface of the mobile electronic device shown in FIG. 3A according to an embodiment of the disclosure.

FIG. 3B illustrates a perspective view showing a rear surface of the mobile electronic device shown in FIG. 3A according to an embodiment of the disclosure.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

A recess or opening may be formed in a portion of a display area of the display 301 to accommodate at least one of the audio module 314, the sensor module 304, the camera module 305, and the light emitting device. At least one of the audio module 314, the sensor module 304, the camera module 305, a fingerprint sensor (not shown), and the light emitting element may be disposed on the back of the display area of the display 301. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
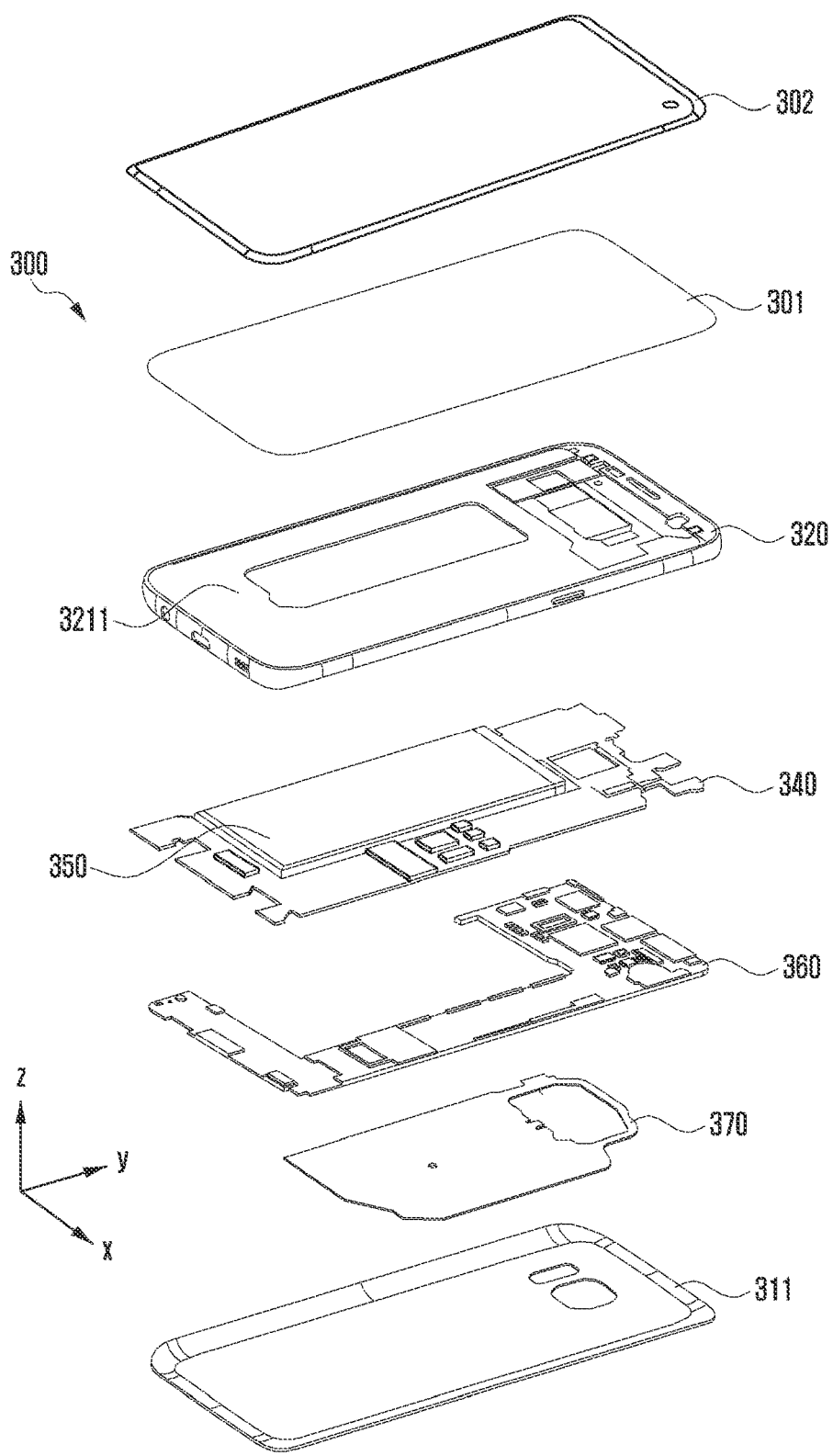
FIG. 3C is an exploded perspective view showing the mobile electronic device shown in FIGS. 3A and 3B according to an embodiment of the disclosure.

FIG. 3C illustrates an exploded perspective view showing a mobile electronic device shown in FIG. 3A according to an embodiment of the disclosure.

Referring to FIG. 3C, the mobile electronic device 300 may include a lateral bezel structure 320, a first support member 3211 (e.g., a bracket), the front plate 302, the display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
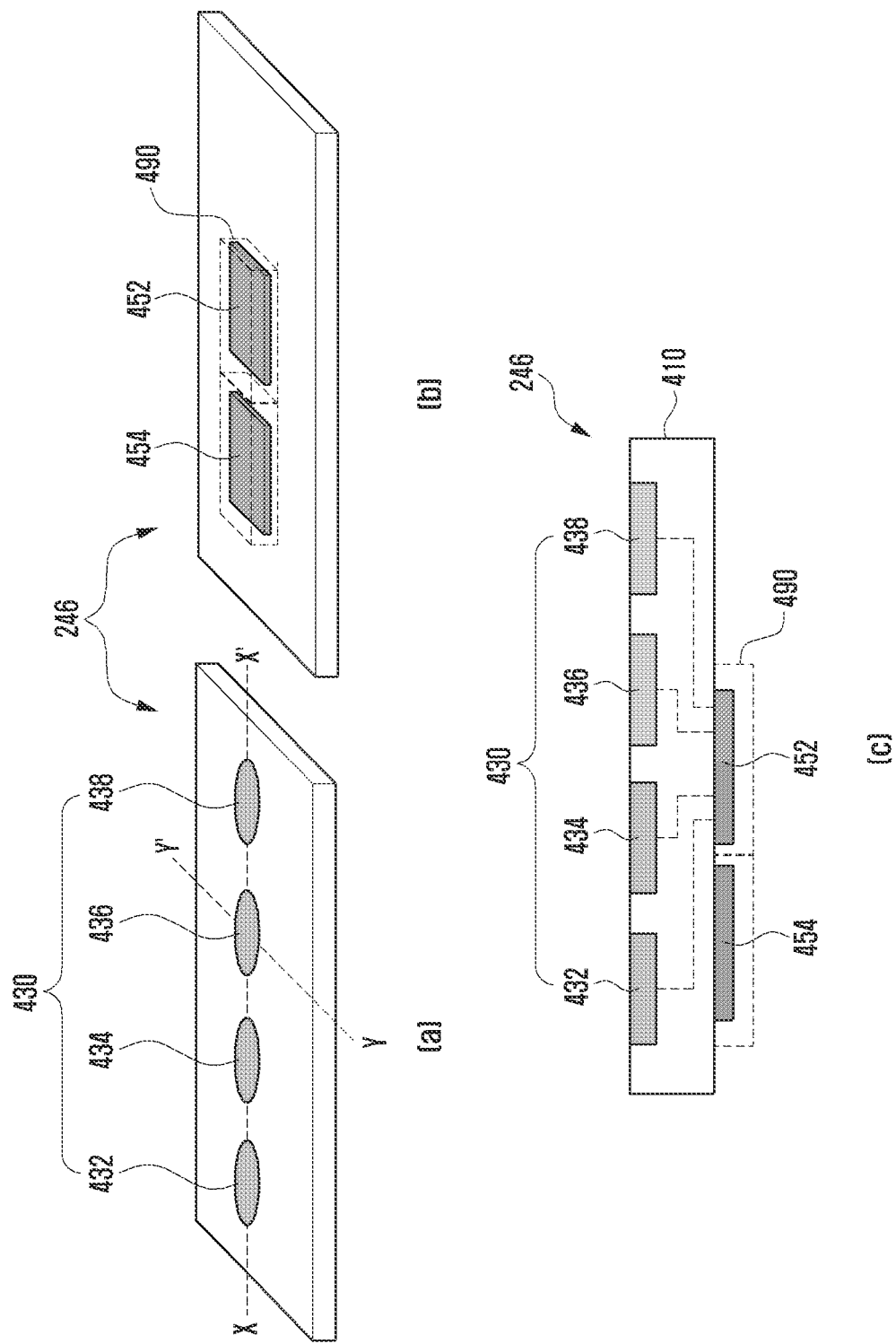
FIG. 4A shows an embodiment of a structure of the third antenna module shown in and described with reference to FIG. 2 according to an embodiment of the disclosure.

FIG. 4A is a diagram illustrating a structure of, for example, a third antenna module described with reference to FIG. 2 according to an embodiment of the disclosure.

Referring to FIG. 4A, view (a) is a perspective view illustrating the third antenna module 246 viewed from one side, and FIG. 4A, view (b) is a perspective view illustrating the third antenna module 246 viewed from the other side. FIG. 4A, view (c) is a cross-sectional view illustrating the third antenna module 246 taken along line X-X' of FIG. 4A.

With reference to FIG. 4A, in one embodiment, the third antenna module 246 may include a printed circuit board 410, an antenna array 430, an RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, and/or 438 disposed to form a directional beam. As illustrated, the antenna elements 432, 434, 436, and/or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
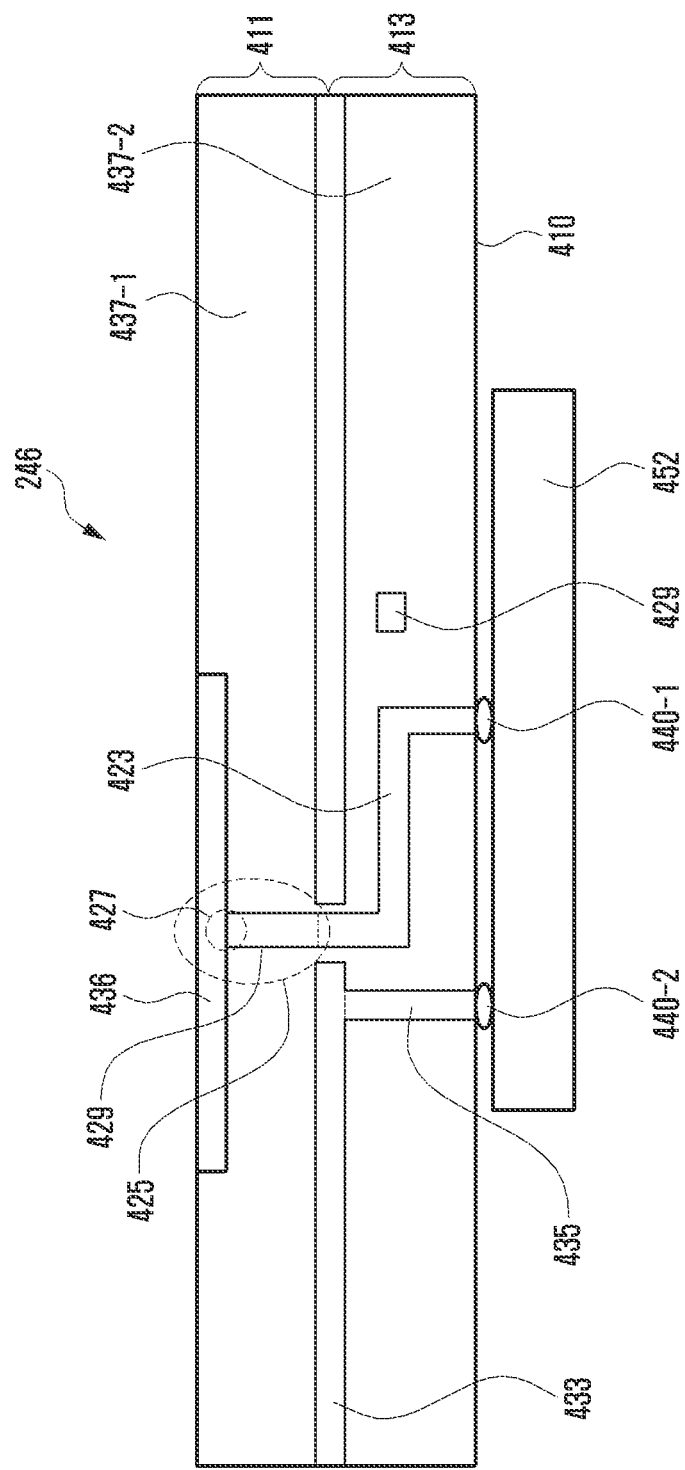
FIG. 4B is a cross-sectional view taken along line Y-Y' in FIG. 4A according to an embodiment of the disclosure.

FIG. 4B is a cross-sectional view illustrating the third antenna module 246 taken along line Y-Y' of FIG. 4A, view (a) according to an embodiment of the disclosure.

Referring to FIG. 4B, the printed circuit board 410 of the illustrated embodiment may include an antenna layer 411 and a network layer 413. The antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Figure 5:
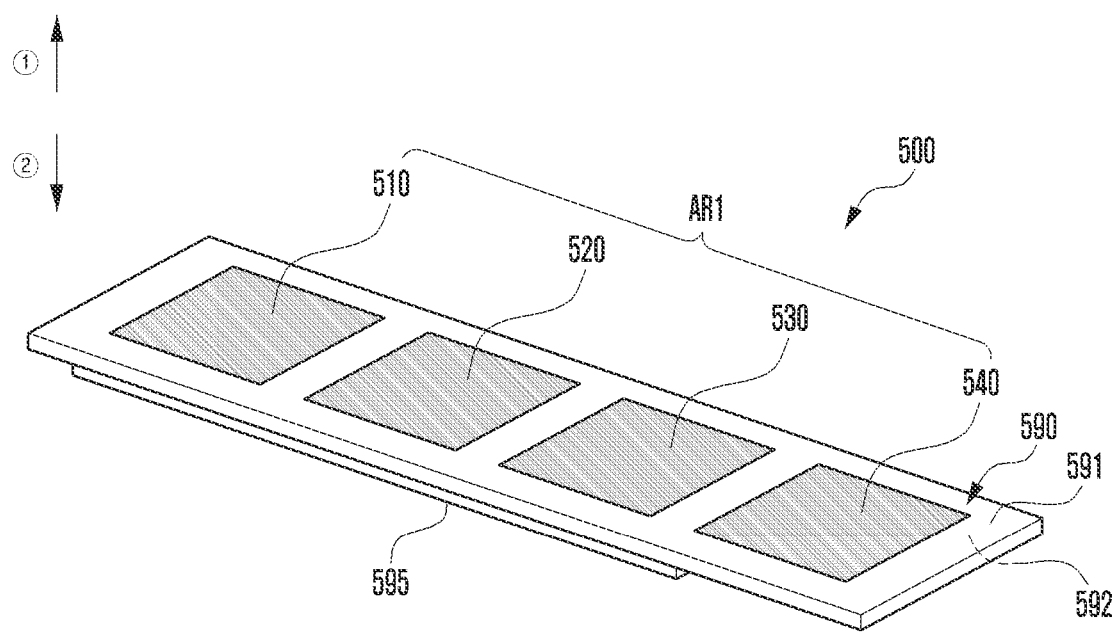
FIG. 5 is a perspective view showing an antenna module according to an embodiment of the disclosure.

Further, in the illustrated embodiment, the RFIC 452 (e.g., the third RFIC 226 of FIG. 2) of FIG. 4A, view (c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429. FIG. 5 is a perspective view showing an antenna module according to an embodiment of the disclosure.

An antenna module 500 of FIG. 5 may be similar to, at least in part, the third antenna module 246 of FIG. 2, or may include other embodiments of the antenna module.

Referring to FIG. 5, the antenna module 500 may include an antenna structure composed of a printed circuit board (PCB) 590 and a plurality of conductive patches 510, 520, 530, and 540. According to an embodiment, the antenna module 500 may include a wireless communication circuit 595 mounted on the PCB 590. According to an embodiment, the antenna structure may include the plurality of conductive patches 510, 520, 530, and 540 disposed on the PCB 590. According to an embodiment, the antenna module 500 may include an array antenna AR1 composed of the plurality of conductive patches 510, 520, 530, and 540. According to an embodiment, the plurality of conductive patches 510, 520, 530, and 540 may be formed on the PCB 590. According to an embodiment, the PCB 590 may have a first surface 591 facing a first direction (denoted by ①) and a second surface 592 facing a second direction (denoted by ②) opposite to the first direction. According to an embodiment, the antenna module 500 may include the wireless communication circuit 595 disposed on the second surface 592 of the PCB 590. In another embodiment, the wireless communication circuit 595 may be spaced apart from the PCB 590 in an inner space of the electronic device and electrically connected to the PCB 590 through an electrical connection member (e.g., a flexible PCB (FPCB)). According to an embodiment, the plurality of conductive patches 510, 520, 530, and 540 may be electrically connected to the wireless communication circuit 595. According to an embodiment, the wireless communication circuit 595 may be configured to transmit and/or receive a radio frequency signal in the range of about 3 GHz to 100 GHz via the array antenna AR1.

According to various embodiments, the plurality of conductive patches 510, 520, 530, and 540 may include a first conductive patch 510, a second conductive patch 520, a third conductive patch 530, and a fourth conductive patch 540 which are disposed at regular intervals on the first surface 591 of the PCB 590 or near the first surface 591 in the PCB 590. The conductive patches 510, 520, 530, and 540 may have the substantially same configuration. Although the antenna module 500 according to an embodiment is illustrated and described as including the array antenna AR1 composed of four conductive patches 510, 520, 530, and 540, this is only and should not be construed as a limitation. Alternatively, the antenna module 500 may include, as the array antenna AR1, one, two, three, five, or more conductive patches. In another embodiment, the antenna module may further include a plurality of conductive patterns (e.g., a dipole antenna) disposed on the PCB 590. In this case, the conductive patterns may be arranged to form a beam pattern direction different from (e.g., perpendicular to) a beam pattern direction of the conductive patches 510, 520, 530, and 540. Although not shown, the antenna module 500 may further include a protective member (e.g., urethane resin) surrounding the wireless communication circuit 595 on the second surface 592 of the PCB 590 and/or a conductive coating member (e.g., electro-magnetic interference (EMI) shielding material) coated on the outer surface of the protective member to shield noise.

Figure 6A:
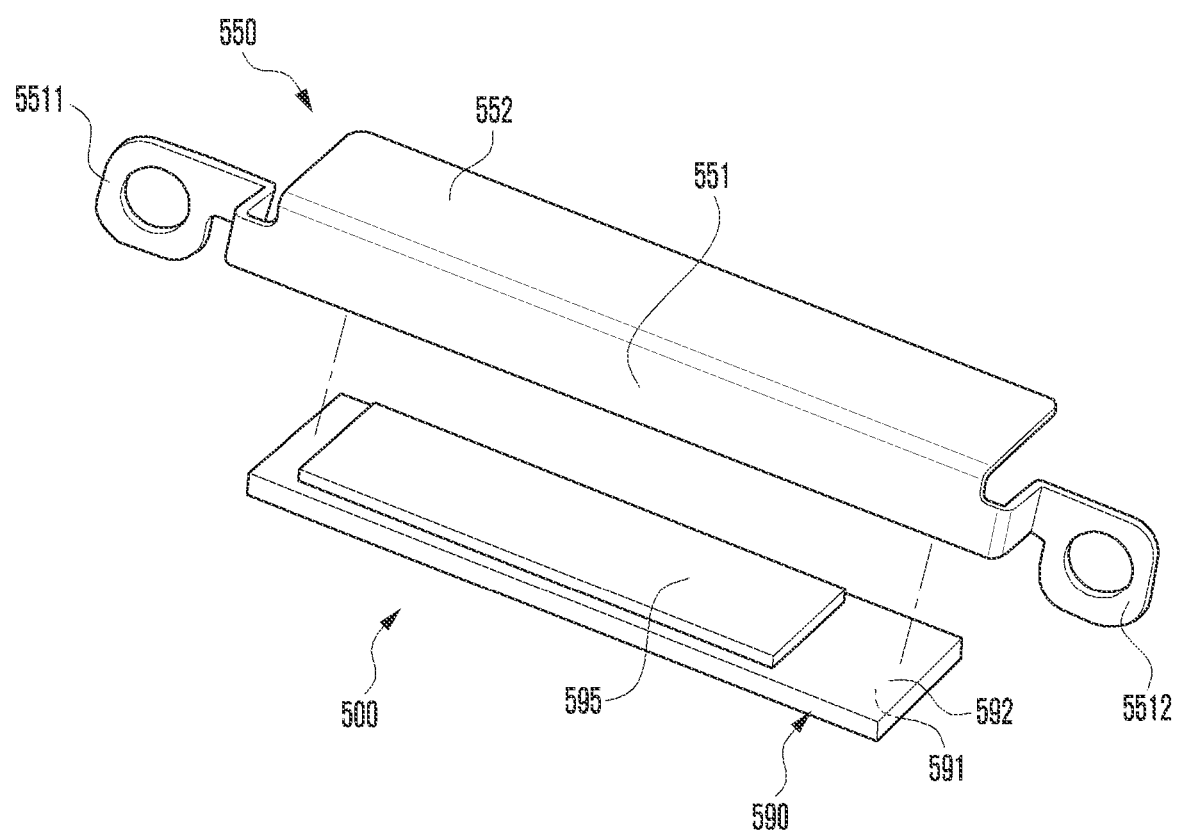
FIG. 6A is an exploded perspective view showing an antenna module and a conductive member to be applied thereto according to an embodiment of the disclosure.

FIG. 6A is an exploded perspective view showing an antenna module and a conductive member to be applied thereto according to an embodiment of the disclosure.

Figure 6B:
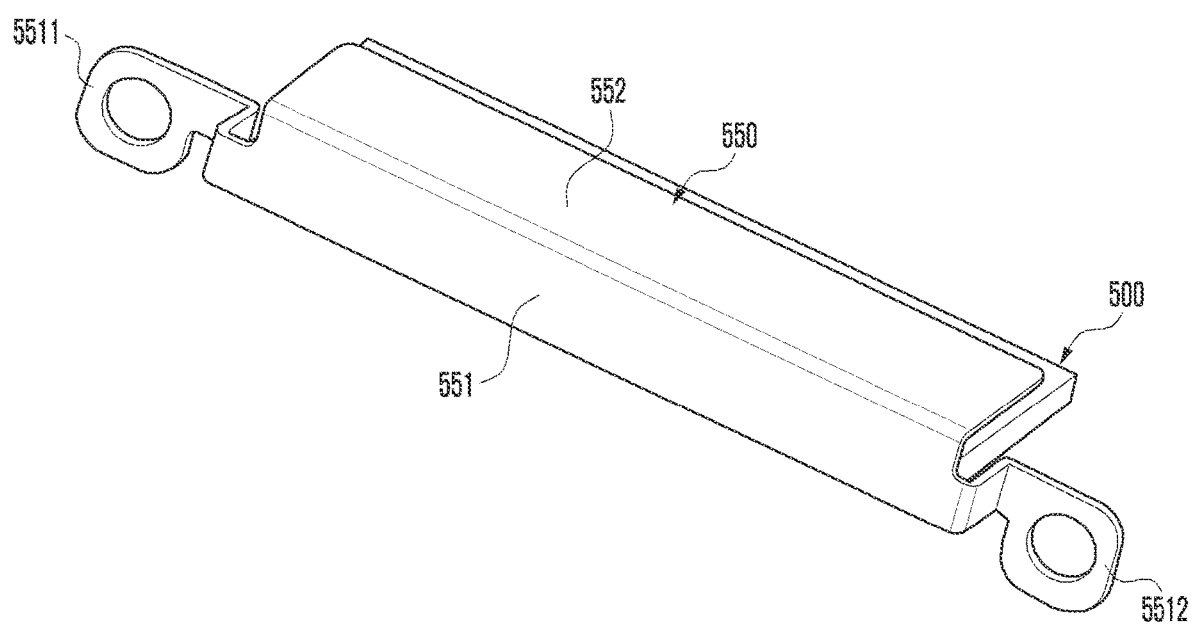
FIG. 6B is a perspective view showing an antenna module and a conductive member applied thereto according to an embodiment of the disclosure.

FIG. 6B is a perspective view showing an antenna module and a conductive member applied thereto according to an embodiment of the disclosure.

Referring to FIGS. 6A and 6B, an electronic device (e.g., the electronic device 300 in FIG. 3A) may include a conductive member 550 fixed, at least in part, to the antenna module 500. According to an embodiment, the conductive member 550 may be fixed to a conductive portion (e.g., a conductive portion 321 in FIG. 7) of a housing (e.g., the housing 310 in FIGS. 3A and 7) and/or to a conductive portion of a support member (e.g., the first support member 3211 in FIG. 7) in an inner space of the electronic device. According to an embodiment, the conductive member 550 may be in physical contact with a conductive portion (e.g., the conductive portion 321 in FIG. 7) of a lateral member (e.g., the lateral member 320 in FIG. 7) and thereby reinforce the rigidity of the antenna module 500. According to an embodiment, the conductive member 550 may be formed of a metal material such as stainless steel (SUS), copper (Cu), or aluminum (Al) and thereby effectively transmit a high-temperature heat emitted from the antenna module 500 to the outside.

According to various embodiments, the conductive member 550 may include a first support part 551 facing, at least in part, (e.g., facing the lateral surface of) the PCB 590, and a second support part 552 extended from the first support part 551 and bent to face another portion (e.g., the second surface 592) of the PCB 590. According to an embodiment, the conductive member 550 may include at least one extension part 5511 and 5512 extended from at least one end of the first support part 551 and fixed to the conductive portion (e.g., the conductive portion 321 in FIG. 7) of the lateral member (e.g., the lateral member 320 in FIG. 7) and/or to the conductive portion of the support member (e.g., the first support member 3211 in FIG. 7). In an embodiment, the at least one extension part 5511 and 5512 may include a pair extended in opposite directions of the conductive member 550. In another embodiment, the at least one extension part 5511 and 5512 may be extended from the second support part 552. Therefore, the antenna module 500 may be supported by the first and second support parts 551 and 552 of the conductive member 550 and fixed to the conductive portion (e.g., the conductive portion 321 in FIG. 7) of the lateral member (e.g., the lateral member 320 in FIG. 7) and/or to the conductive portion of the support member (e.g., the first support member 3211 in FIG. 7) through the at least one extension part 5511 and 5512 by a fastening member such as a screw.

Figure 7:
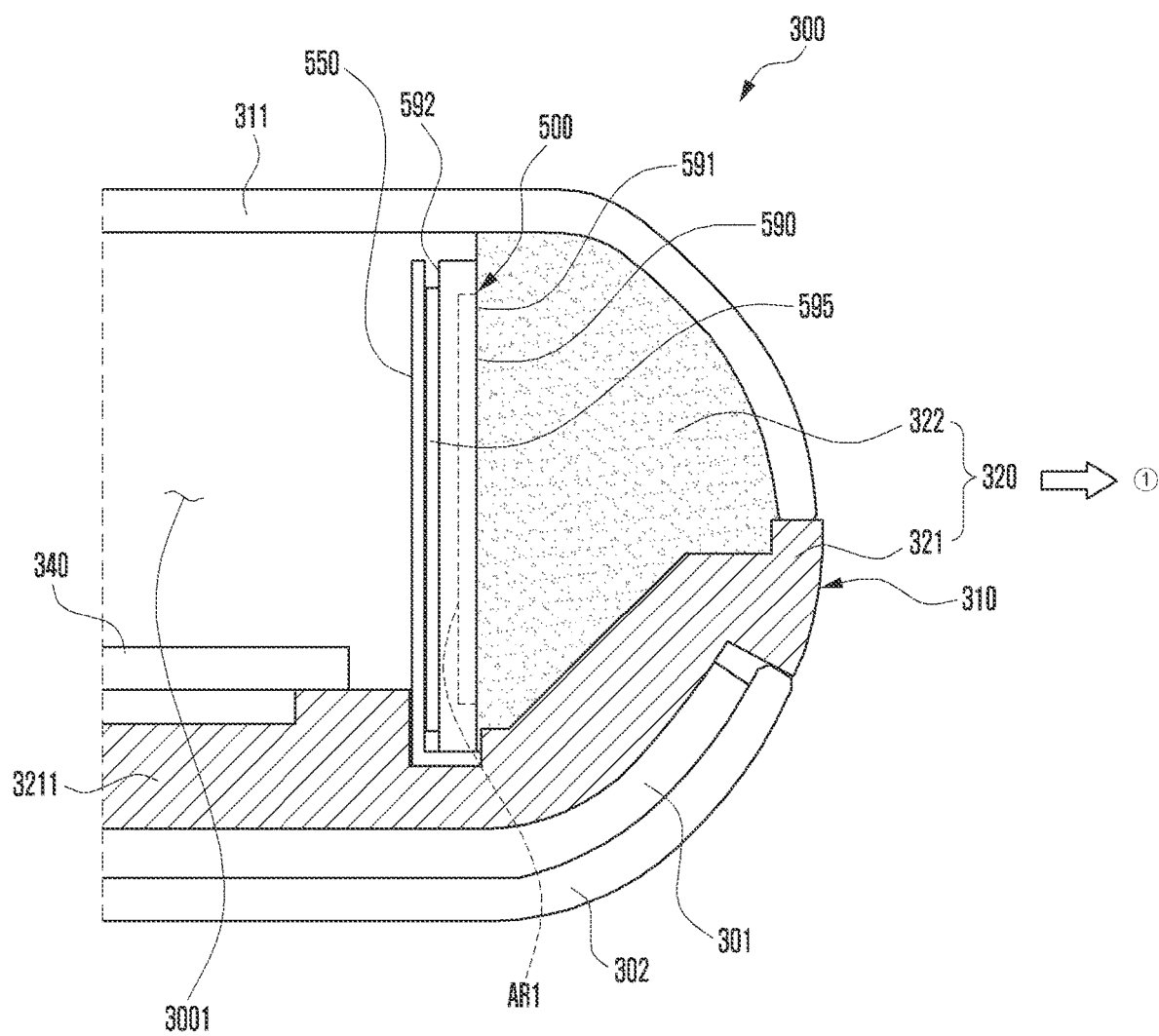
FIG. 7 is a cross-sectional view partially showing an electronic device, viewed from line A-A' in FIG. 3B, according to an embodiment of the disclosure.

FIG. 7 is a cross-sectional view partially showing an electronic device, viewed from line A-A' in FIG. 3B, according to an embodiment of the disclosure.

Referring to FIG. 7, the electronic device 300 may include the housing 310 that includes the front plate 302 (e.g., a front cover) facing a first direction (e.g., the —Z direction), the rear plate 311 (e.g., a rear cover) facing a direction (e.g., the Z direction) opposite to the front plate 302, and the lateral member 320 surrounding an inner space 3001 between the front plate 302 and the rear plate 311. According to an embodiment, the lateral member 320 may include a conductive portion 321 (e.g., a metal member) disposed at least in part and a non-conductive portion 322 (e.g., a polymer member) insert-injected into the conductive portion 321. In another embodiment, the non-conductive portion 322 may be replaced with a space or any other dielectric material. In still another embodiment, the non-conductive portion 322 may be structurally combined with the conductive portion 321. According to an embodiment, the lateral member 320 may include a support member 3211 (e.g., the first support member 3211 in FIG. 3C) extended partially into the inner space 3001. According to an embodiment, the first support member 3211 may be extended from the lateral member 320 into the inner space 3001 or formed by a structural combination with the lateral member 320. According to an embodiment, the first support member 3211 may be extended from the conductive portion 321. According to an embodiment, the support member 3211 may support at least a portion of the antenna module 500 disposed in the inner space 3001. According to an embodiment, the first support member 3211 may be disposed to support at least a portion of a display 301. According to an embodiment, the display 301 may be disposed to be visible from the outside through at least a portion of the front plate 302. According to an embodiment, the display 301 may include a flexible display.

According to various embodiments, the antenna module 500 may be disposed in a direction perpendicular to the front plate 302 in the inner space 3001 of the electronic device 300. According to an embodiment, the antenna module 500 may be mounted such that the array antenna AR1 including conductive patches (e.g., the conductive patches 510, 520, 530, and 540 in FIG. 5A) faces the lateral member 320. For example, the antenna module 500 may be disposed such that the first surface 591 of the PCB 590 faces the lateral member 320 and thus a beam pattern is formed in a direction (denoted by ①) faced by the lateral member 320. According to an embodiment, at least a portion of the lateral member 320 faced by the antenna module 500 may be formed as the non-conductive portion 322 such that a beam pattern is formed in a direction (denoted by ①) faced by the lateral member 320. According to an embodiment, the electronic device 300 may include a device substrate 340 (e.g., the PCB 340 in FIG. 3C) disposed in the inner space 3001. According to an embodiment, although not shown, the antenna module 500 may be electrically connected to the device substrate 340 through an electrical connection member (e.g., an FPCB connector).

Figure 8A:
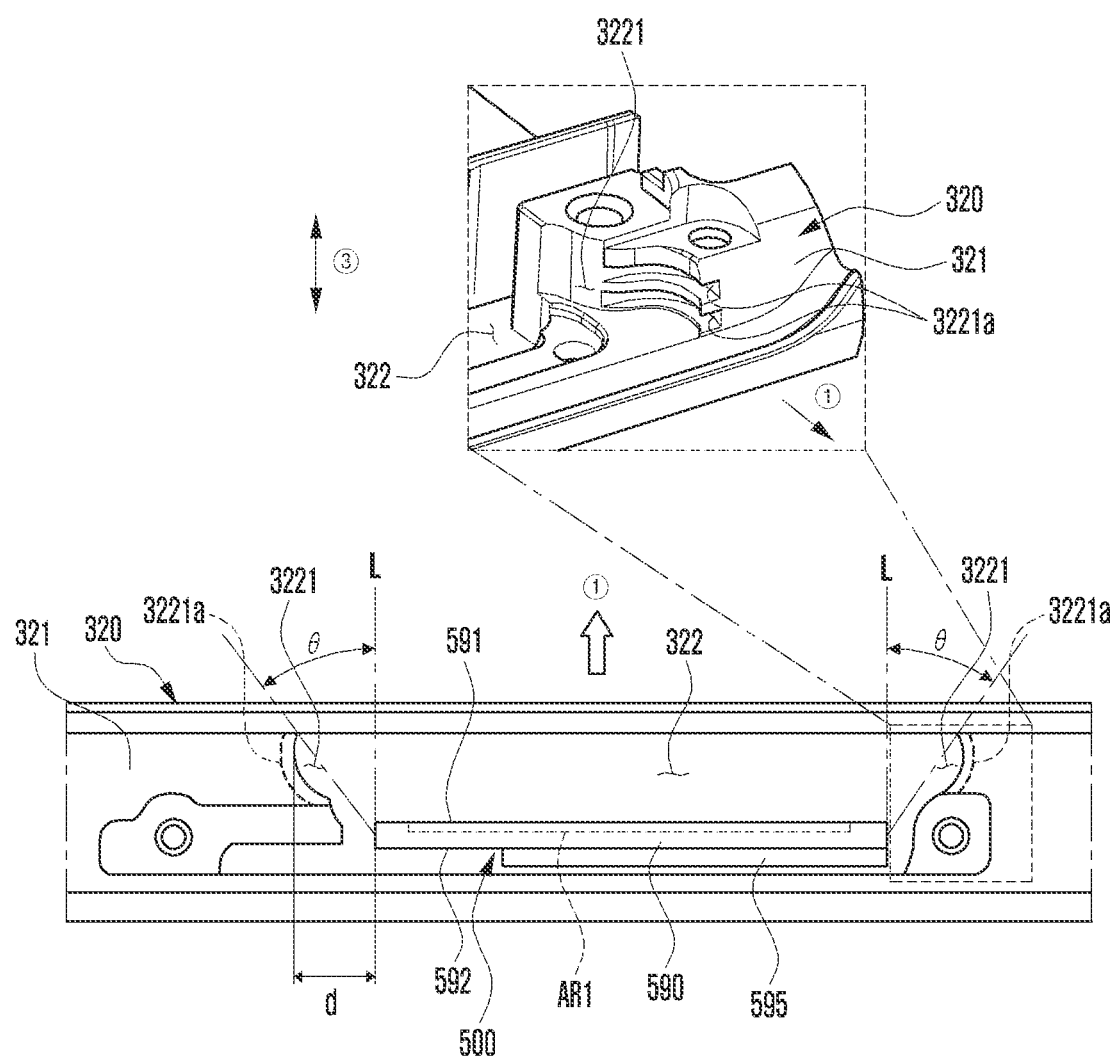
FIG. 8A is a view partially showing an electronic device, viewed from line B-B' in FIG. 3B, according to an embodiment of the disclosure.

FIG. 8A is a view partially showing an electronic device, viewed from line B-B' in FIG. 3B, according to an embodiment of the disclosure.

FIG. 8A shows only the conductive portion 321 when the rear plate 311 is viewed from above, while substantially omitting the non-conductive portion 322. The non-conductive portion 322 may be filled with an insulating member such as a polymer member.

Referring to FIG. 8A, the lateral member 320 may include the non-conductive portion 322 (e.g., a polymer member) disposed to correspond to a region where a beam pattern of the antenna module 500 is formed. According to an embodiment, the non-conductive portion 322 may be insert-injected into the conductive portion 321. According to an embodiment, a boundary region between the non-conductive portion 322 and the conductive portion 321 may be disposed near the antenna module 500. According to an embodiment, the boundary region may have an engaging structure for disallowing the conductive portion 321 and the non-conductive portion 322, after combined with each other, to be separated from each other by external impact. According to an embodiment, the boundary region may be placed at a position which is not overlapped with the antenna module 500 when the lateral member 320 is viewed from the outside. For example, the conductive portion 321 may include a concave portion 3221 formed concavely in the boundary region. According to an embodiment, the non-conductive portion 322 may be formed as a part of the lateral member 320 of the electronic device 300 by being filled in the concave portion 3221 through insert injection.

According to various embodiments, when the concave portion 3221 is formed deeper than a predetermined depth, an excitation current may be generated by a current trap phenomenon through the concave portion 3221. This excitation current may degrade the radiation performance of the antenna module 500. Therefore, the depth and/or shape of the concave portion 3221 may become important parameters in determining the antenna radiation performance.

According to various embodiments, when the rear plate 311 is viewed from above as in FIG. 3B, the concave portion 3221 may be formed such that an inclined angle (θ) thereof does not exceed about 60 degrees. As illustrated, the inclined angle (θ) is an angle formed by a starting point of the concave portion 3221 (i.e., a contact point with the lateral member 320) with respect to a virtual line (L) formed from both ends of the PCB 590 toward the lateral member 320 (i.e., in a direction perpendicular to the lateral member 320 as denoted by ①). In addition, having the inclined angle (θ) does not exceed about 60 degrees, the concave portion 3221 may be formed at a certain depth and in a certain shape. The shape of the concave portion 3221 may be varied such as a curved shape or a flat shape. In a certain embodiment, the concave portion 3221 may be formed such that the inclined angle (θ) does not exceed about 60 degrees with respect to a virtual line (L) formed from both ends of the array antenna AR1 toward the lateral member 320. According to an embodiment, the inclined angle (θ) of the concave portion 3221 may range from about 30 degrees to about 60 degrees in consideration of beam coverage (e.g., ±30 degrees with respect to the virtual line (L)) of the array antenna AR1. According to an embodiment, the concave portion 3221 may be gradually narrowed or widened along the inclination angle (θ) with respect to the virtual line (L). According to an embodiment, the inner surface of the concave portion 3221 may be a curved plane having a specific radius of curvature.

According to an embodiment, the concave portion 3221 may prevent an unwanted separation between the non-conductive portion 322 and the conductive portion 321 in a horizontal direction (denoted by ①) by external impact. According to an embodiment, the concave portion 3221 may have at least one slit 3221a further recessed from the inner surface of the concave portion 3221. According to an embodiment, the slit 3221a may be formed in a direction substantially parallel to the rear plate 311. According to an embodiment, the slit 3221a may increase a contact area between the conductive portion 321 and the non-conductive portion 322 and thereby improve an engaging force. According to an embodiment, the slit 3221a may prevent an unwanted separation between the non-conductive portion 322 and the conductive portion 321 in a vertical direction (denoted by ③) by external impact. According to an embodiment, the radiation characteristics of the antenna module 500 may be determined depending on the shape, depth, width, and/or number of the slits 3221a.

According to various embodiments, a distance (d) between the concave portion 3221 and the PCB 590, as illustrated, may be determined so as not to exceed a quarter of wavelength (i.e., ¼*λ) in the greatest operating frequency wavelength carrier of the antenna module.

Figure 8B:
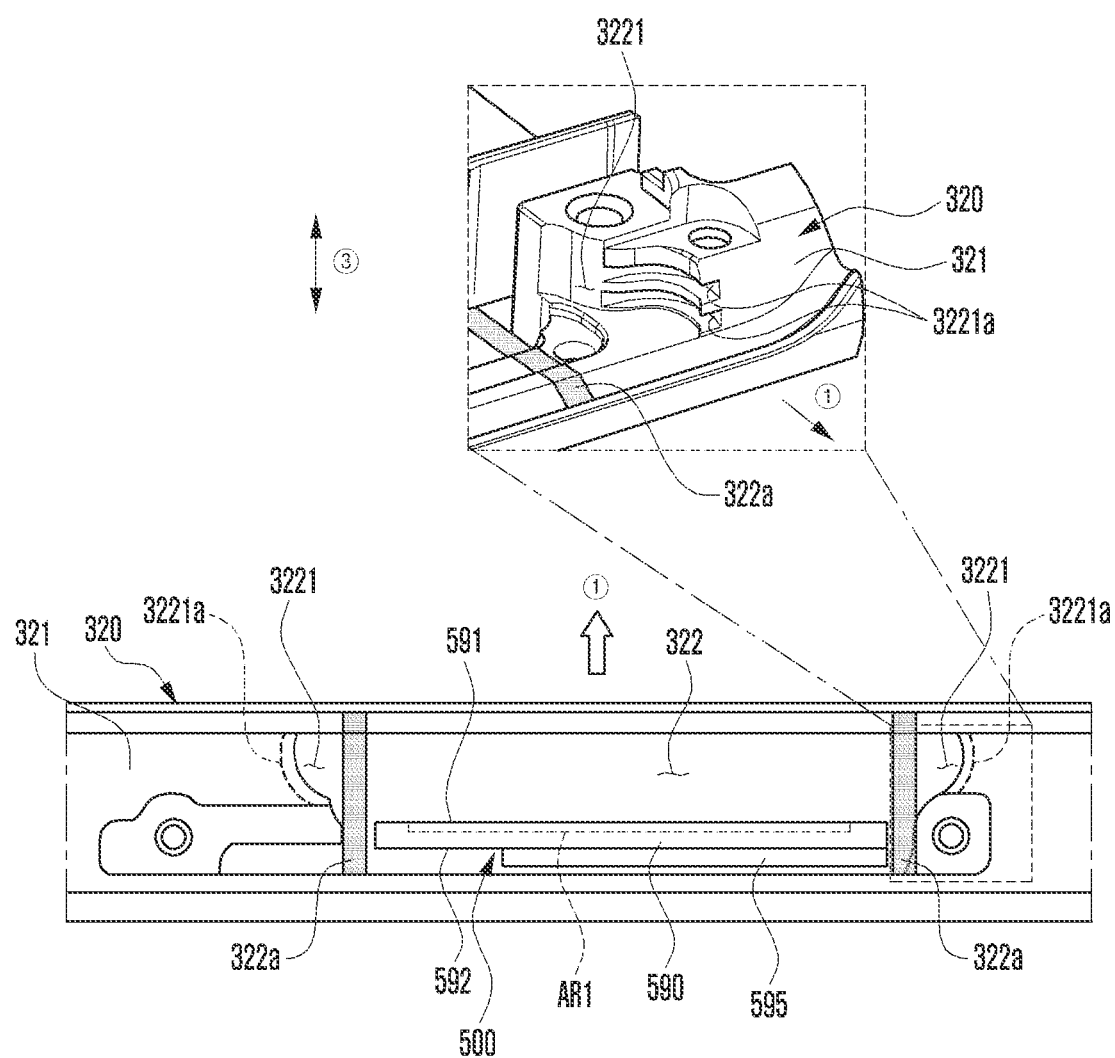
FIG. 8B is a view partially showing a lateral member having a non-conductive region around an antenna module according to an embodiment of the disclosure.

FIG. 8B is a view partially showing a lateral member having a non-conductive region around an antenna module according to an embodiment of the disclosure.

Referring to FIG. 8B, the lateral member 320 may include, in the conductive portion 321, at least one non-conductive region 322a disposed around the antenna module 500. According to an embodiment, the at least one non-conductive region 322a may be disposed near both right and left ends of the PCB 590 of the antenna module 500 when the lateral member 320 is viewed from the outside. According to an embodiment, the at least one non-conductive region 322a may be formed to cross, at least in part, the lateral member 320 between the PCB 590 and the concave portion 3221. According to an embodiment, the at least one non-conductive region 322a may be formed through injection of the same material as or a different material from that of the non-conductive portion 322. The at least one non-conductive region 322a may prevent a double radiation phenomenon caused by the concave portion 3221 when a beam is emitted from the array antenna AR1.

Figure 9A:
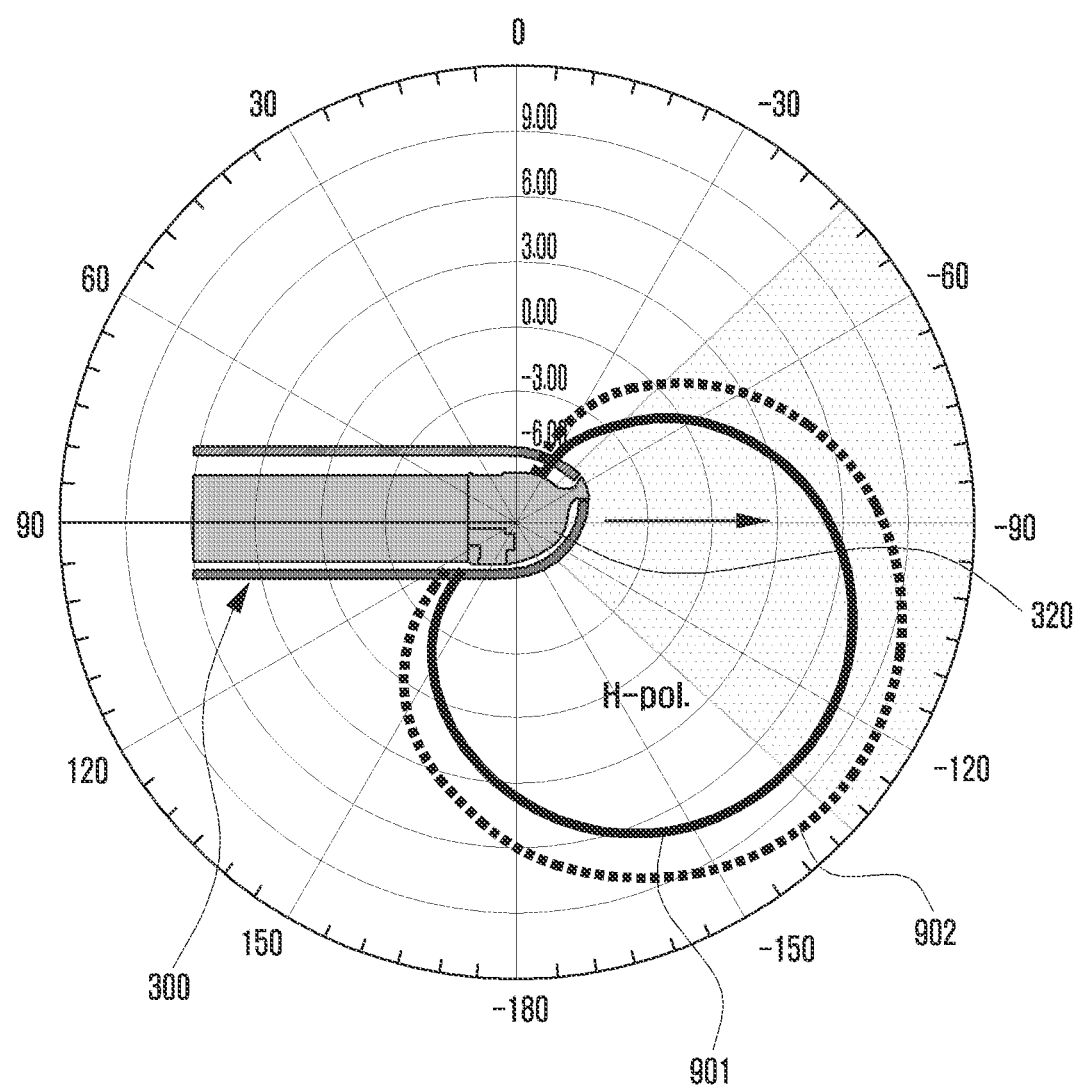
FIGS. 9A and 9B are graphs showing radiation patterns and gains by horizontal polarization of an antenna module according to various embodiments of the disclosure.
Figure 9B:
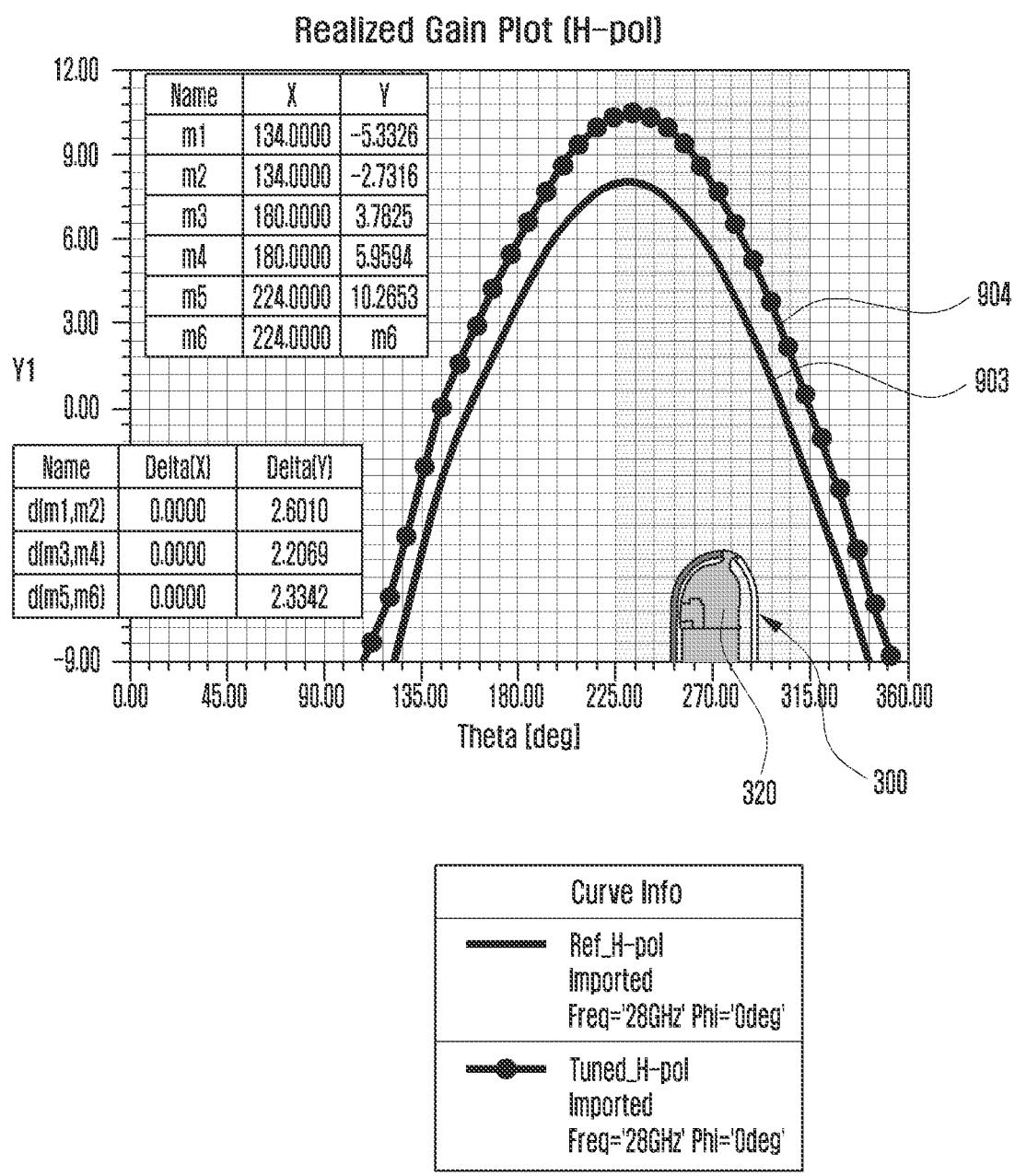

FIGS. 9A and 9B are graphs showing radiation patterns and gains by horizontal polarization (H-pol) of an antenna module according to various embodiments of the disclosure.

Referring to FIGS. 9A and 9B, compared to horizontal polarization 901 and gain 903 of a typical antenna module in which a concave portion has an inclined angle (θ) that exceeds about 60 degrees, horizontal polarization 902 and gain 904 of the antenna module 500 according to an embodiment of the disclosure exhibit relatively excellent sensitivity characteristics and gain improved by about 2.5 dB. The reason is that, as described above with reference to FIGS. 7 and 8A, a concave portion (e.g., the concave portion 3221 in FIG. 8A) is formed in a conductive portion (e.g., the conductive portion 321 in FIG. 8A) such that an inclined angle (θ) thereof does not exceed about degrees.

Figure 9C:
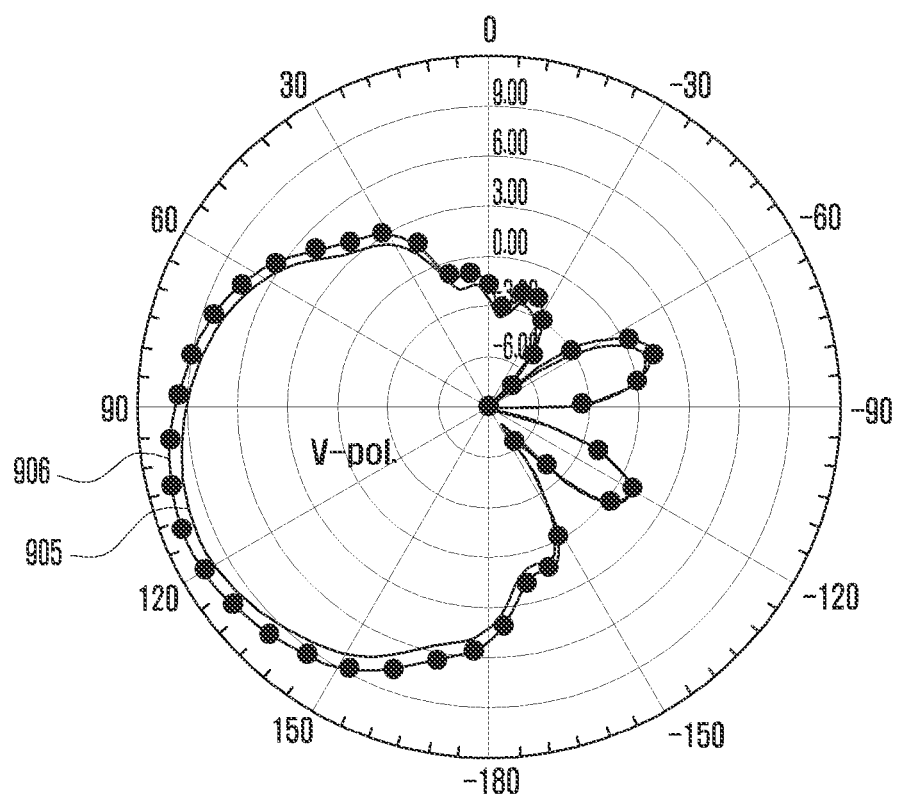
FIG. 9C is a graph showing a radiation pattern by vertical polarization of an antenna module according to an embodiment of the disclosure.
Figure 9C:
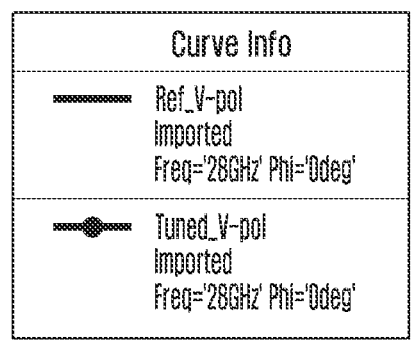

FIG. 9C is a graph showing a radiation pattern by vertical polarization (V-pol) of an antenna module according to an embodiment of the disclosure.

Referring to FIG. 9C, compared to vertical polarization 905 of a typical antenna module in which a concave portion has an inclined angle (θ) that exceeds about degrees, vertical polarization 906 of the antenna module 500 according to an embodiment of the disclosure exhibit relatively excellent sensitivity characteristics. The reason is that, as described above with reference to FIGS. 7 and 8A, a concave portion (e.g., the concave portion 3221 in FIG. 8A) is formed in a conductive portion (e.g., the conductive portion 321 in FIG. 8A) such that an inclined angle (θ) thereof does not exceed about 60 degrees.

Figure 10:
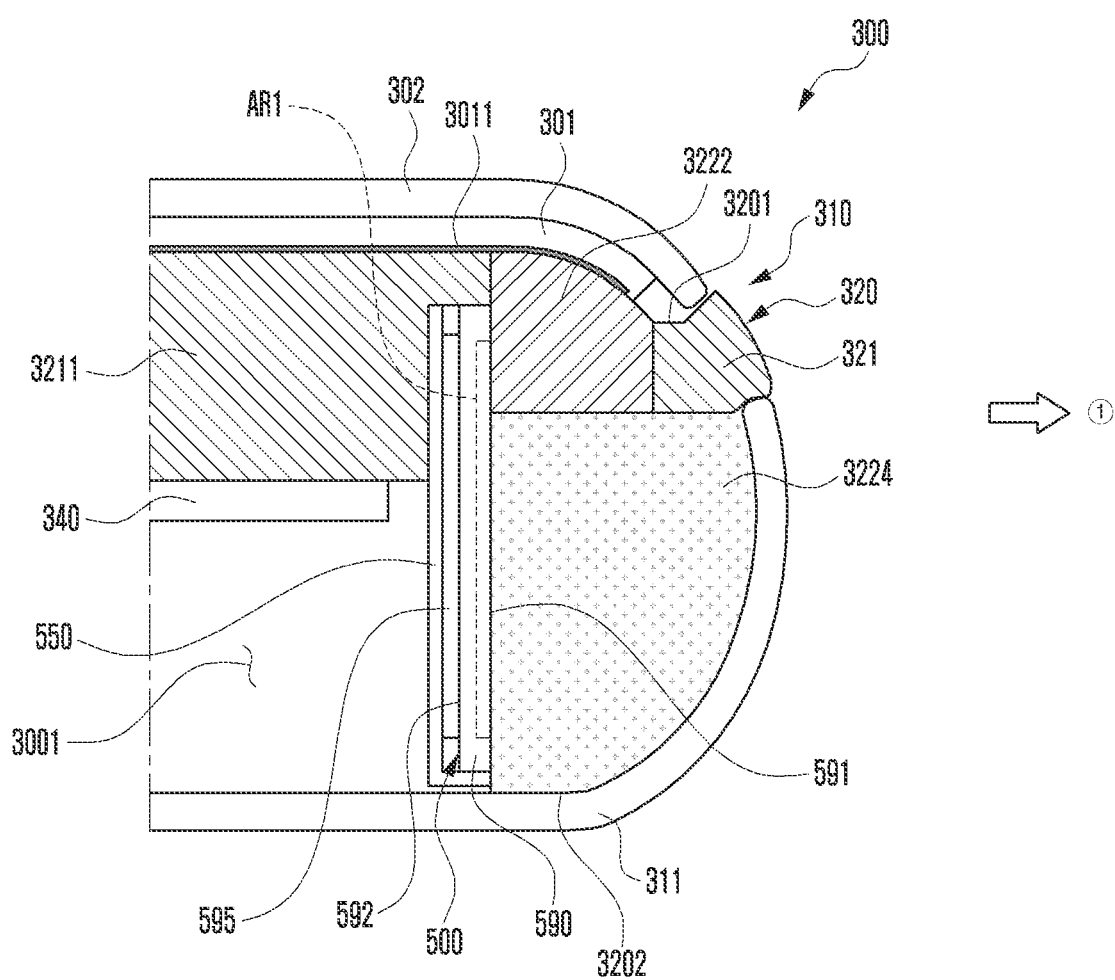
FIG. 10 is a cross-sectional view partially showing an electronic device, viewed from line C-C' in FIG. 3A, according to an embodiment of the disclosure.

FIG. 10 is a cross-sectional view partially showing an electronic device, viewed from line C-C' in FIG. 3A, according to an embodiment of the disclosure.

Figure 11A:
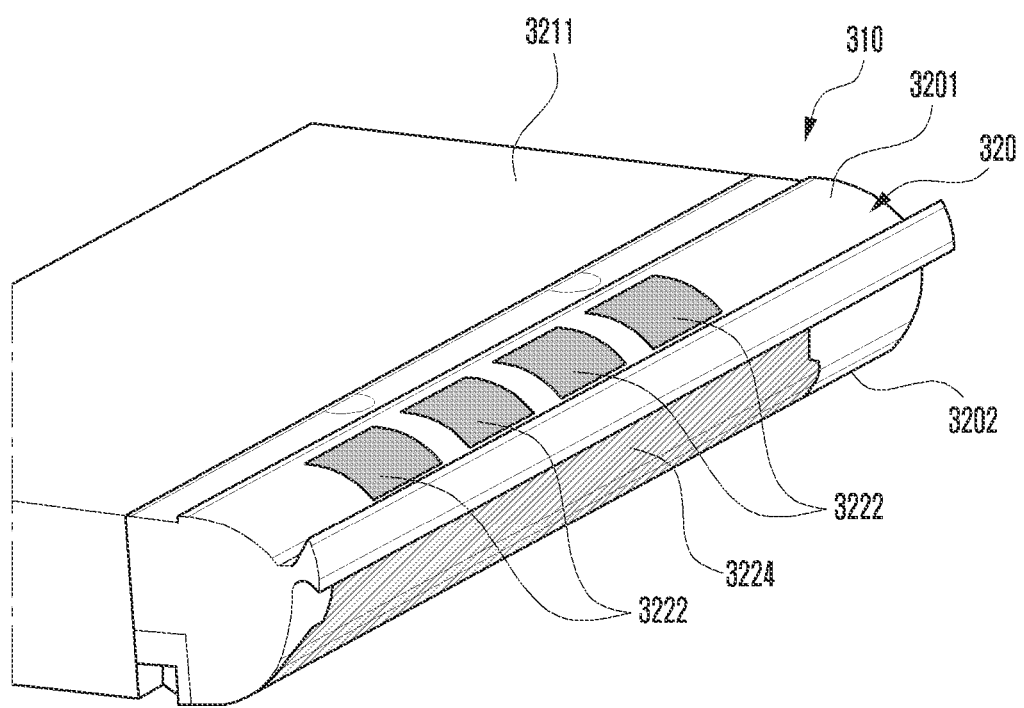
FIG. 11A is a perspective view partially showing a housing according to an embodiment of the disclosure.

FIG. 11A is a perspective view partially showing a housing according to an embodiment of the disclosure.

In the following description of the electronic device 300, the same components as those described above are denoted by the same reference numerals, and detailed descriptions thereof may be omitted.

According to various embodiments, in the antenna module 500 that performs radiation in a direction (denoted by ①) facing from the inner space 3001 of the electronic device 300 to the lateral member 320, a cancelation phenomenon (or null phenomenon) may occur due to a phase difference between a beam pattern directly radiated from the antenna module 500 and a beam pattern reflected by the first support member 3211 disposed nearby. This may degrade the radiation performance of the antenna module 500. Various embodiments of the disclosure may have a configuration for preventing the performance degradation of the antenna through a structural change of the lateral member 320.

Referring to FIGS. 10 and 11A, the electronic device 300 may include the housing 310 that includes the front plate 302 (e.g., a front cover), the rear plate 311 (e.g., a rear cover) facing a direction opposite to the front plate 302, and the lateral member 320 surrounding the inner space 3001 between the front plate 302 and the rear plate 311. According to an embodiment, the lateral member 320 may have a first surface 3201 facing the front plate 302, and a second surface 3202 facing a direction opposite to the first surface 3201. According to an embodiment, the lateral member 320 may include the conductive portion 321 (e.g., a metal member) disposed at least in part, and a first non-conductive portion 3224 (e.g., the non-conductive portion 322 in FIG. 7, e.g., a polymer member) insert-injected into the conductive portion 321. According to an embodiment, the lateral member 320 may include the support member 3211 (e.g., the first support member 3211 in FIG. 3C) extended at least partially into the inner space 3001.

According to various embodiments, the front plate 302 may be disposed on the first surface 3201 of the lateral member 320. According to an embodiment, the front plate 302 may be supported by at least a part of the lateral member 320 including the first support member 3211. According to an embodiment, the electronic device 300 may include a display 301 disposed between the front plate 302 and the lateral member 320. According to an embodiment, the display 301 may include a polarization layer (not shown), a display panel (not shown), at least one additional layer (e.g., a cushion layer and/or an embossing layer, not shown), and/or a conductive sheet 3011, which are stacked sequentially on the rear surface of the front plate 302. According to an embodiment, the display 301 may include the conductive sheet 3011 (e.g., a Cu sheet) disposed for noise shielding on the rear surface of the display panel.

According to various embodiments, the antenna module 500 may be disposed in a direction perpendicular to the front plate 302 in the inner space 3001 of the electronic device 300 through a conductive member 550. According to an embodiment, the antenna module 500 may be mounted such that an array antenna AR1 including conductive patches (e.g., the conductive patches 510, 520, 530, and 540 in FIG. 5A) (e.g., a plurality of antenna elements) face the lateral member 320. For example, the antenna module 500 may be disposed such that a first surface 591 of a PCB 590 faces the lateral member 320, and thus a beam pattern may be formed in a direction (denoted by ①) faced by the lateral member 320 of the electronic device 300. According to an embodiment, at least a part of the lateral member 320 facing the antenna module 500 may be the first non-conductive portion 3224 that allows a beam pattern to be formed in the direction (denoted by ①) faced by the lateral member 320. According to an embodiment, the electronic device 300 may include a device substrate 340 (e.g., the PCB 340 in FIG. 3C) disposed in the inner space 3001. According to an embodiment, although not shown, the antenna module 500 may be electrically connected to the device substrate 340 through an electrical connector (e.g., an FPCB connector).

According to various embodiments, at least a part of the conductive portion 321 of the lateral member 320 may be formed in a shape for supporting the display 301 and the front plate 302 above one side of the antenna module 500. Therefore, the conductive portion 321 of the lateral member 320 may affect, at least in part, a beam pattern radiated in a direction of the front plate 302.

According to various embodiments, the lateral member 320 may further include at least one second non-conductive portion 3222 disposed at a position corresponding to the array antenna AR1 of the antenna module 500 in the direction of the front plate 302. According to an embodiment, the second non-conductive portion 3222 may be inserted-injected together with the first non-conductive portion 3224 (e.g., the non-conductive portion 322 in FIG. 7) into the conductive portion 321. In another embodiment, the first non-conductive portion 3224 and the second non-conductive portion 3222 may be formed of insulating materials having different properties (e.g., different dielectric constants). In still another embodiment, the second non-conductive portion 3222 may be an empty space in which no insulating material is disposed. The second non-conductive portion 3222 may be formed in the first surface 3201 (e.g., a flat portion) of the lateral member 320 and/or a curved surface extended laterally from the first surface 3201. According to an embodiment, the at least one second non-conductive portion 3222 may be disposed at a position overlapped at least in part with the array antenna AR1 when the front plate 302 is viewed from above and/or when the lateral member 320 is viewed from outside. According to an embodiment, a plurality of second non-conductive portions 3222 may be disposed at positions corresponding to respective conductive patches (e.g., the first conductive patch 510, the second conductive patch 520, the third conductive patch 530, and/or the fourth conductive patch 540 in FIG. 5). Therefore, a beam pattern radiated from the antenna module 500 in the direction of the lateral member 320 is increased upward in radiation length up to the conductive sheet 3011 of the display 301 through the second non-conductive portion 3222. This may help to reduce the cancelation phenomenon as compared to an antenna module disposed near the lateral member 320 having no second non-conductive portion 3222.

Figure 11B:
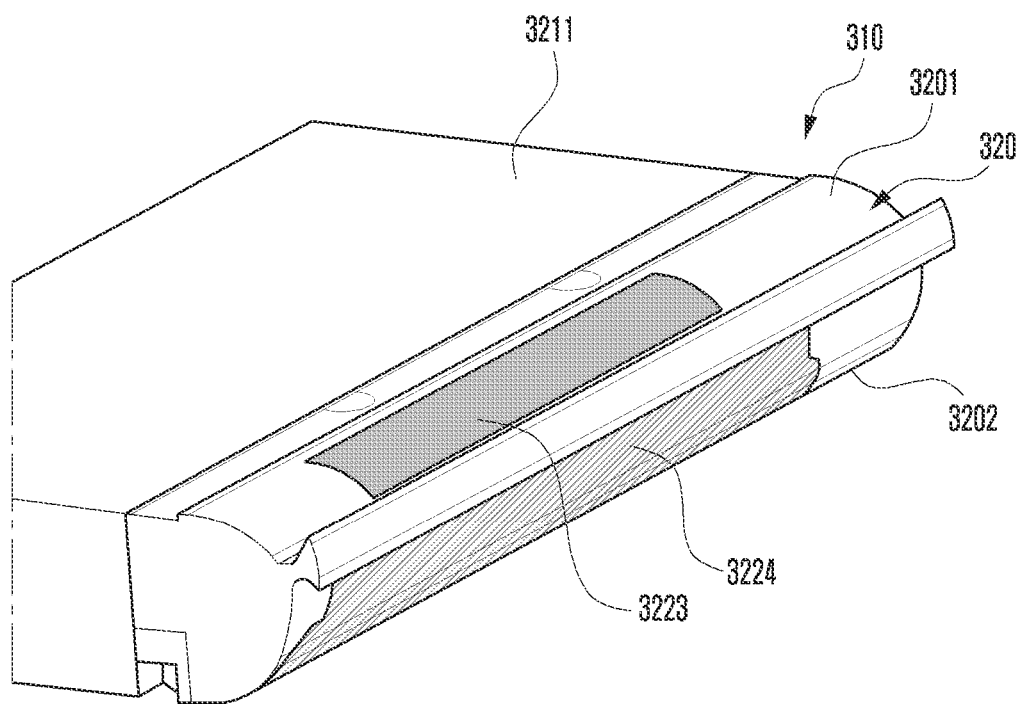
FIG. 11B is a perspective view partially showing a housing according to an embodiment of the disclosure.

FIG. 11B is a perspective view partially showing a housing according to an embodiment of the disclosure.

Referring to FIG. 11B, the lateral member 320 may include a second non-conductive portion 3223 disposed in the first surface 3201 and/or a curved surface extended laterally from the first surface 3201. According to an embodiment, the second non-conductive portion 3223 may be formed in a size overlapped at least in part with a plurality of conductive patches (e.g., the first conductive patch 510, the second conductive patch 520, the third conductive patch 530, and/or the fourth conductive patch 540 in FIG. 5) of the array antenna AR1 when the front plate 302 is viewed from above and/or when the lateral member 320 is viewed from outside.

Figure 12A:
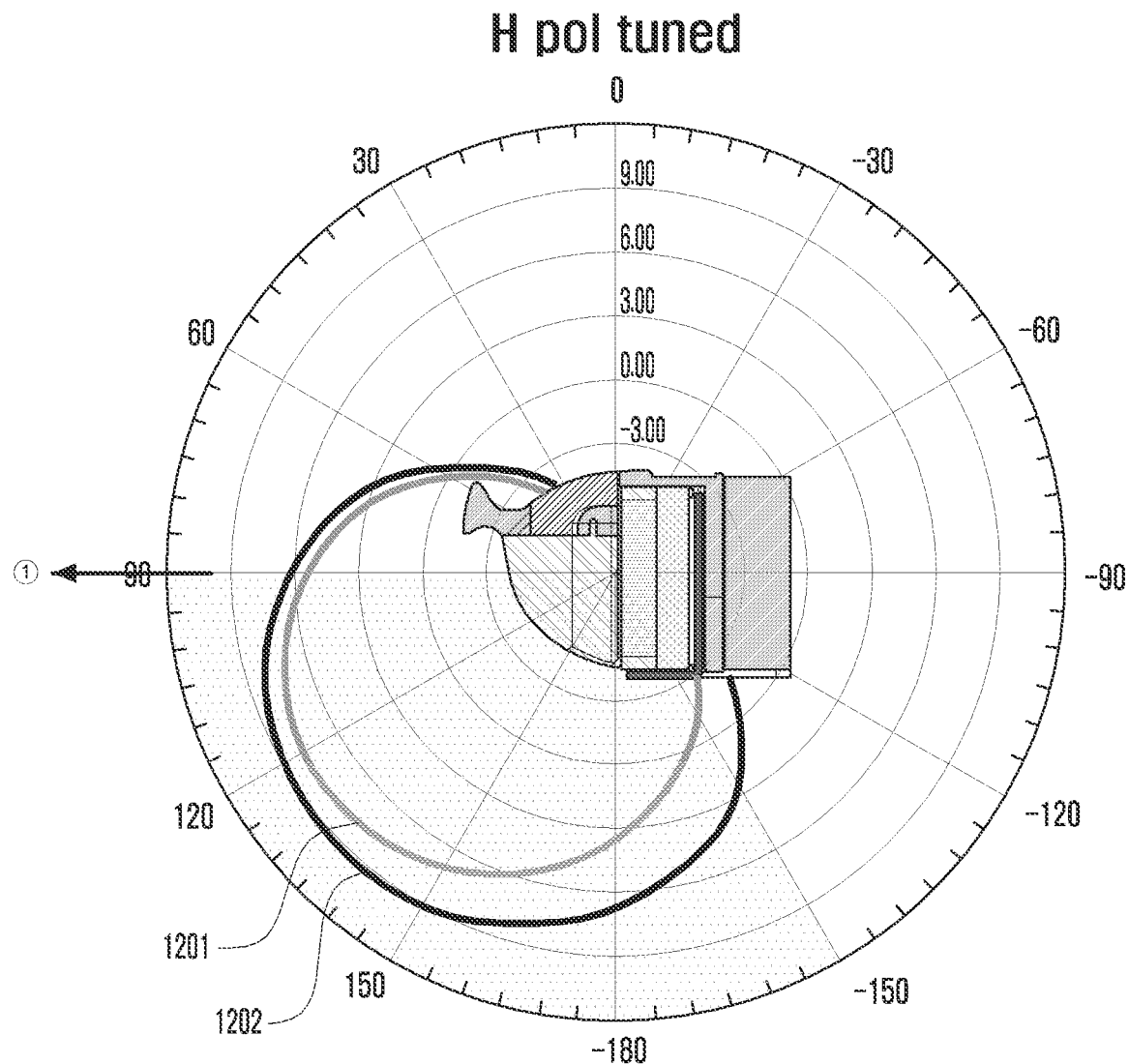
FIGS. 12A and 12B are graphs showing radiation patterns and gains by horizontal polarization of the antenna module of FIG. 10 according to various embodiments of the disclosure.
Figure 12B:
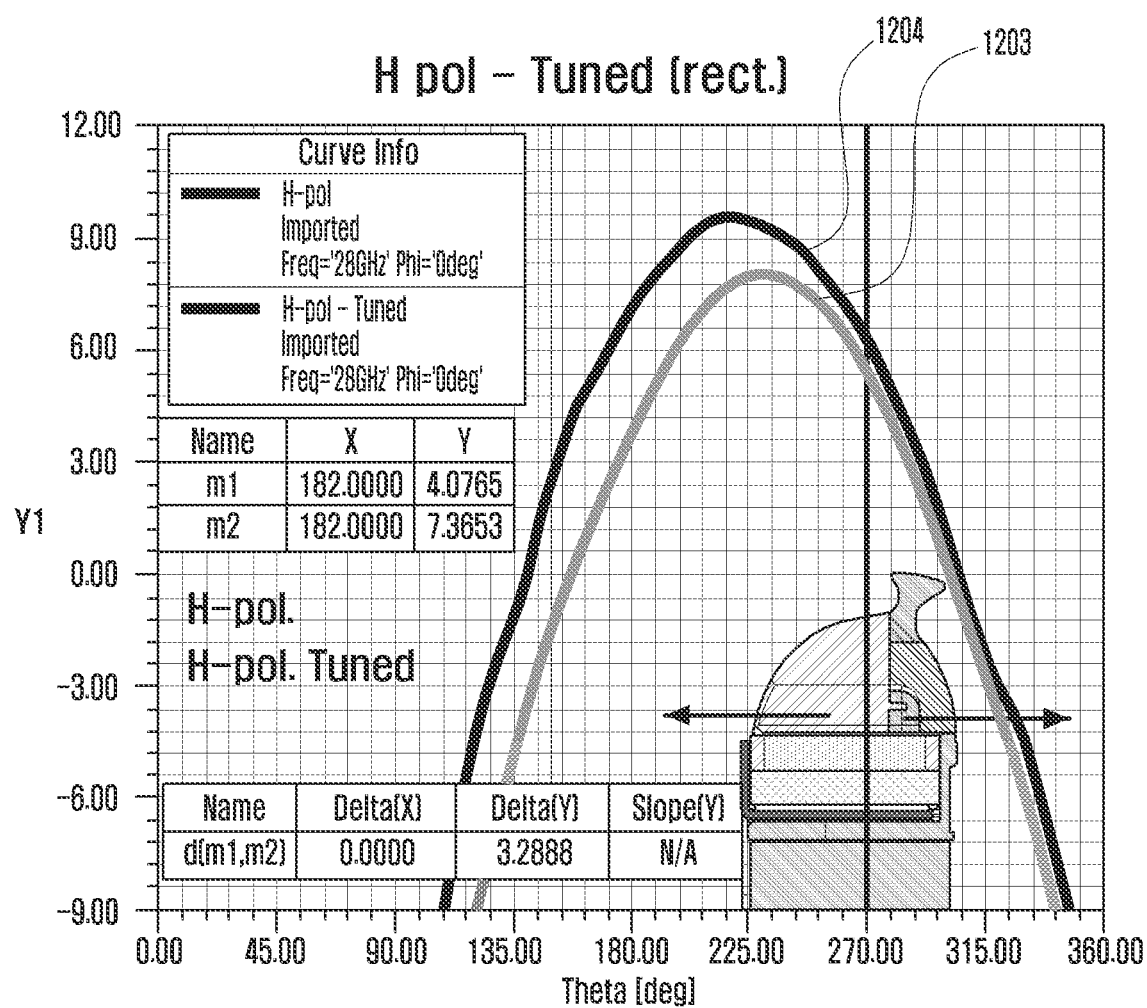

FIGS. 12A and 12B are graphs showing radiation patterns and gains by horizontal polarization (H-pol) of the antenna module of FIG. 10 according to various embodiments of the disclosure.

Referring to FIGS. 12A and 12B, compared to horizontal polarization 1201 and gain 1203 of a typical antenna module in which a lateral member has a conductive portion, horizontal polarization 1202 and gain 1204 of the antenna module (e.g., the antenna module 500 in FIG. 10) according to an embodiment of the disclosure exhibit relatively excellent sensitivity characteristics and high gain. The reason is that, as described above, a lateral member (e.g., the lateral member 320 in FIG. 10) of the antenna module according to an embodiment may include a second non-conductive portion (e.g., the second non-conductive portion 3222 in FIG. 10) disposed at a position overlapped at least in part with an array antenna (e.g., the array antenna AR1 in FIG. when a front plate (e.g., the front plate 302 in FIG. 10) is viewed from above and/or when the lateral member is viewed from outside.

Figure 13:
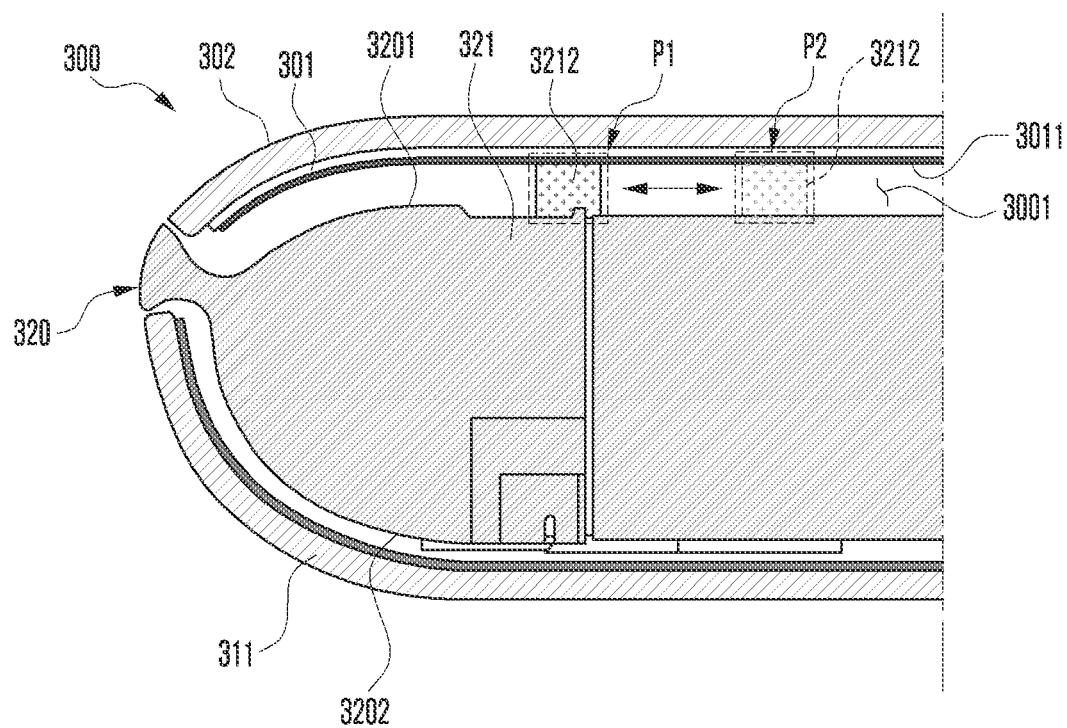
FIG. 13 is a cross-sectional view partially showing an electronic device including a conductive connection member according to an embodiment of the disclosure.

FIG. 13 is a cross-sectional view partially showing an electronic device including a conductive connection member according to an embodiment of the disclosure.

Referring to FIG. 13, when an antenna module (e.g., the antenna module 500 in FIG. 10) operates through the lateral member 320 including a second non-conductive portion (e.g., the second non-conductive portion 3222 in FIG. 10), a beam form of vertical polarization (V-pol) may be distorted by a conductive sheet 3011 (e.g., a Cu sheet) disposed on a rear surface of a display 301 (e.g., a display panel). According to an embodiment of the disclosure, in order to suppress such a beam form distortion of vertical polarization, the electronic device 300 may include at least one conductive connection member 3212 disposed between a conductive portion 321 of the lateral member 320 and the conductive sheet 3011. According to an embodiment, the conductive connection member 3212 may be disposed to be in physical contact with both the conductive sheet 3011 and the conductive portion 321 of the lateral member 320. According to an embodiment, the conductive connection member 3212 may be formed of a metal member. Thus, the conductive sheet 3011 electrically connected to the conductive member 321 through the conductive connection member 3212 may be seen as at least a part of the conductive member 321 disposed near the antenna module 500.

According to various embodiments, the antenna module 500 may be configured to allow vertical polarization (V-pol) to be adjusted independently without substantial change of horizontal polarization (H-pol) through a movement of the conductive connection member 3212 between the conductive sheet 3011 and the lateral member 320.

Figure 14A:
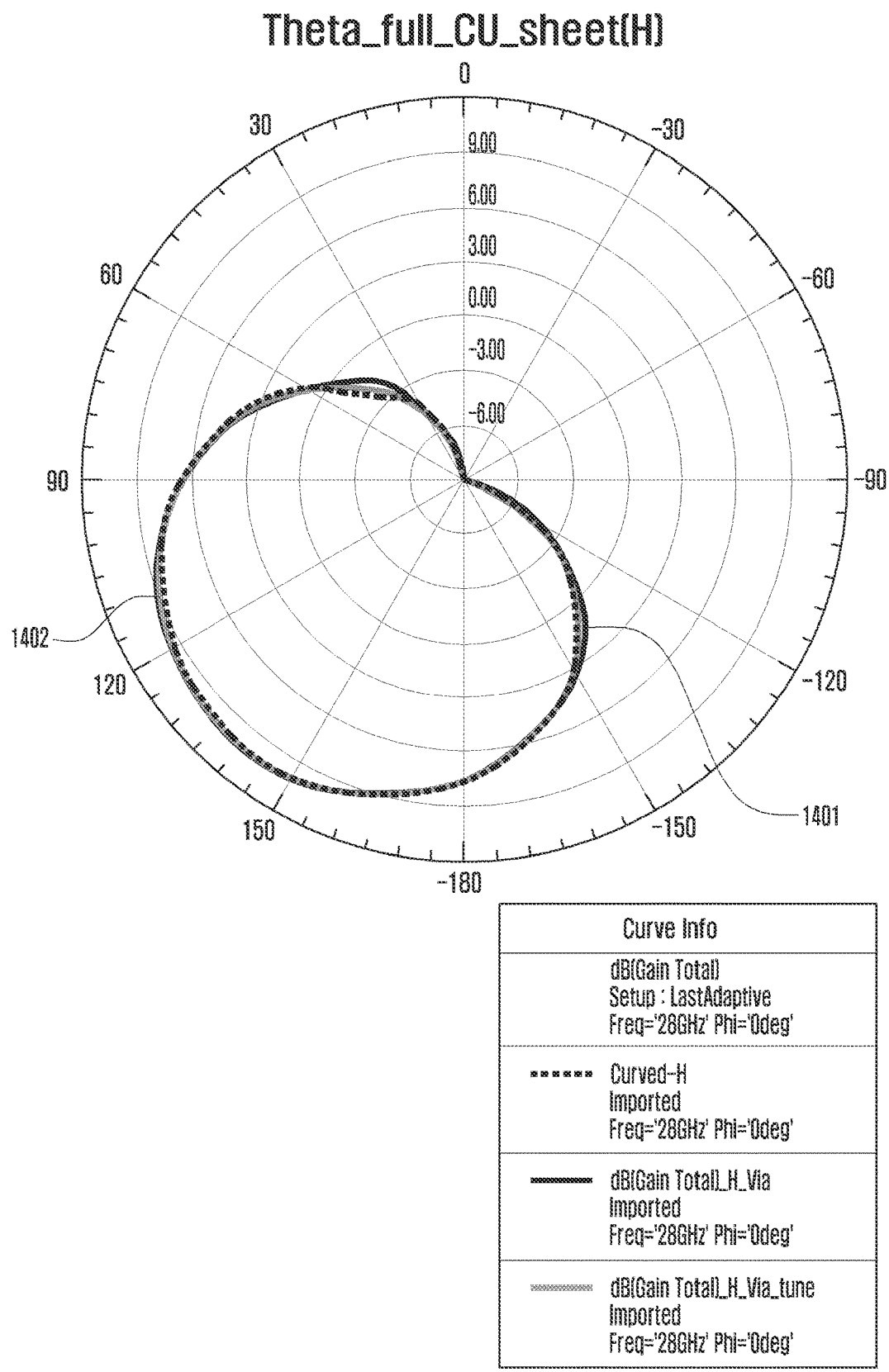
FIG. 14A is a radiation pattern view showing horizontal polarization of an antenna module before and after a movement of a conductive connection member according to an embodiment of the disclosure.

FIG. 14A is a radiation pattern view showing horizontal polarization (H-pol) of an antenna module before and after a movement of a conductive connection member according to an embodiment of the disclosure.

Referring to FIG. 14A, even if the conductive connection member 3212 is moved between the conductive sheet 3011 and the lateral member 320, horizontal polarization 1402 after movement may be exhibited at the same position as horizontal polarization 1401 before movement. This means that even when the conductive connection member 3212 is moved, the horizontal polarization (H-pol) may be substantially fixed.

Figure 14B:
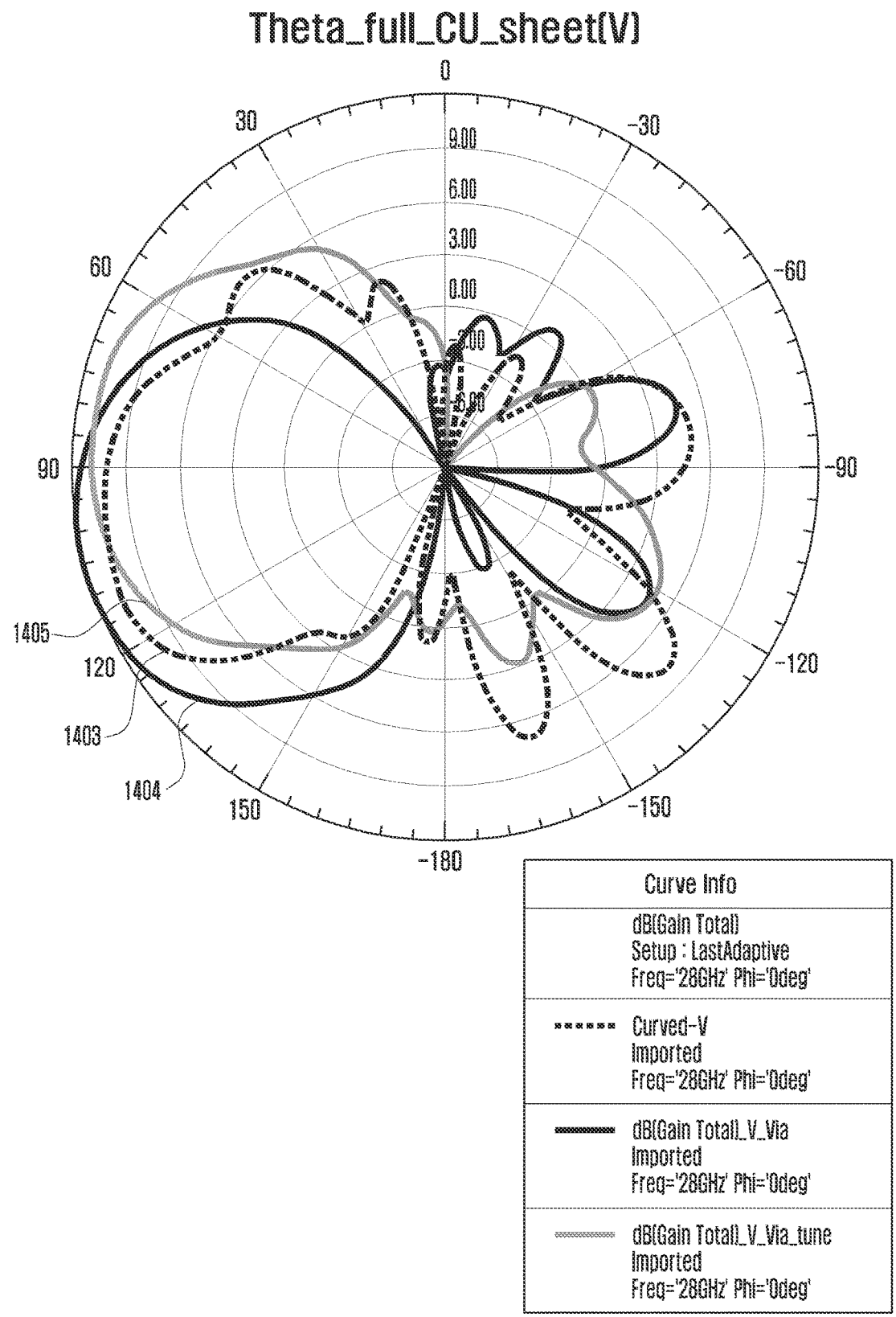
FIG. 14B is a radiation pattern view showing vertical polarization of an antenna module before and after a movement of a conductive connection member according to an embodiment of the disclosure.

FIG. 14B is a radiation pattern view showing vertical polarization (V-pol) of an antenna module before and after a movement of a conductive connection member according to an embodiment of the disclosure.

As shown in FIG. 13, when the conductive connection member 3212 is moved from a first position (P1) to a second position (P2) between the conductive sheet 3011 and the lateral member 320, vertical polarization (V-pol) may be adjusted. Referring to FIG. 14B, vertical polarization 1403 in case where the conductive connection member 3212 of FIG. 13 is not applied, vertical polarization 1404 before movement of the conductive connection member 3212 of FIG. 13, and vertical polarization 1405 after the movement are all different from each other. This may mean that independent tuning of vertical polarization (V-pol) is possible depending on the presence and/or movement of the conductive connection member 3212.

Figure 15:
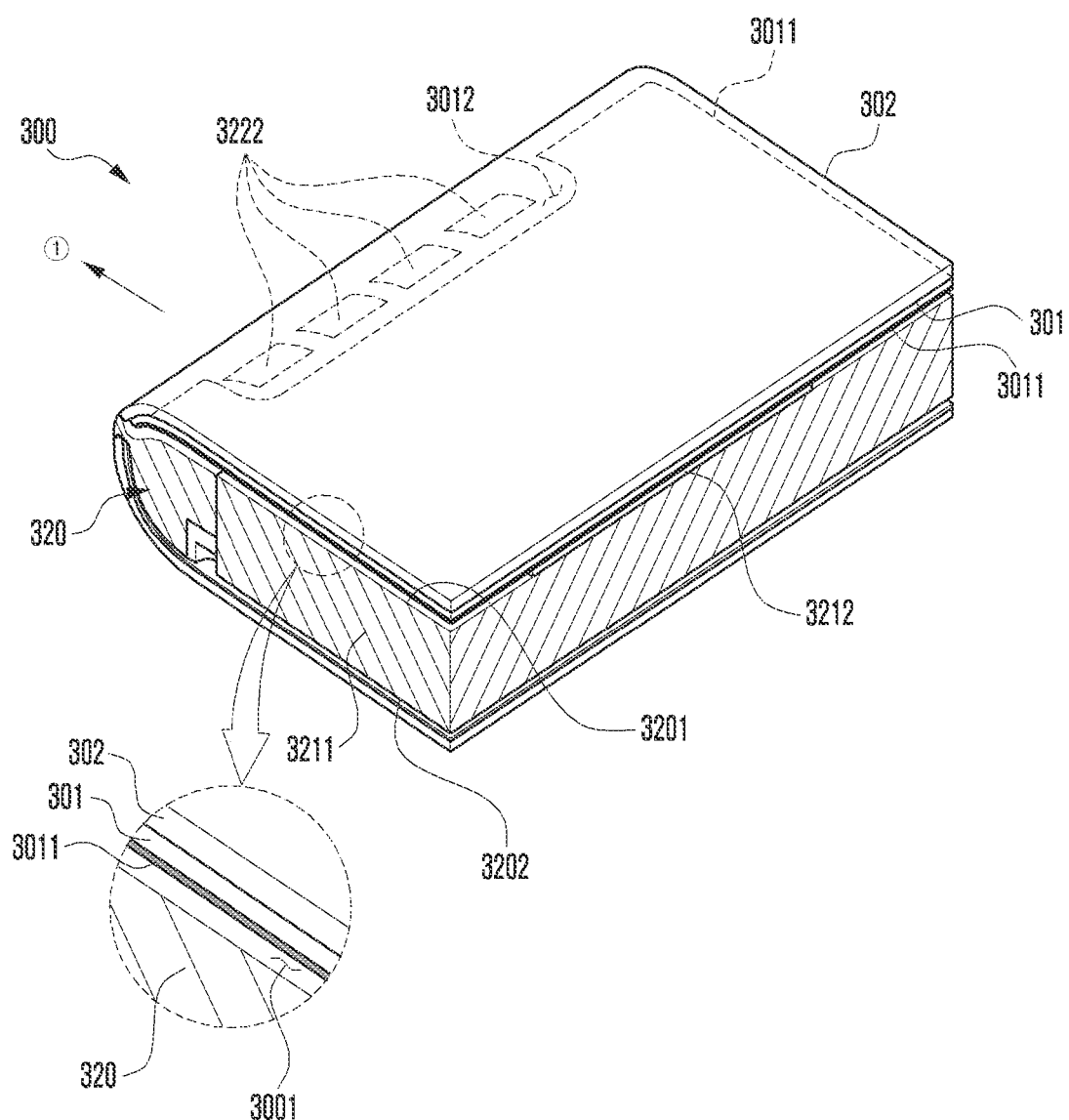
FIG. 15 is a perspective view partially showing an electronic device including a conductive sheet having a notch according to an embodiment of the disclosure.

FIG. 15 is a perspective view partially showing an electronic device including a conductive sheet having a notch according to an embodiment of the disclosure.

Referring to FIG. 15, when the antenna module (e.g., the antenna module 500 in FIG. 10) operates through the lateral member 320 in the electronic device including the second non-conductive portion 3222 and the conductive connection member 3212 as described above in FIG. 13, the sensitivity may be degraded by the conductive sheet 3011 (e.g., a Cu sheet) disposed on the rear surface of the display 301. In order to prevent such a degradation of sensitivity, the electronic device 300 may include, for example, a notch 3012 formed in at least a part of the conductive sheet 3011. According to an embodiment, the notch 3012 may have a region overlapped with the second non-conductive area 3222 when the front plate 302 is viewed from above. According to an embodiment, in the inner space 3001 of the electronic device 300, the antenna module (e.g., the antenna module 500 in FIG. 10) may form a beam pattern in the direction of the display 301 through the second non-conductive portion 3222 formed in the lateral member 320 and the notch 3012 formed in the conductive sheet 3011.

Figure 16:
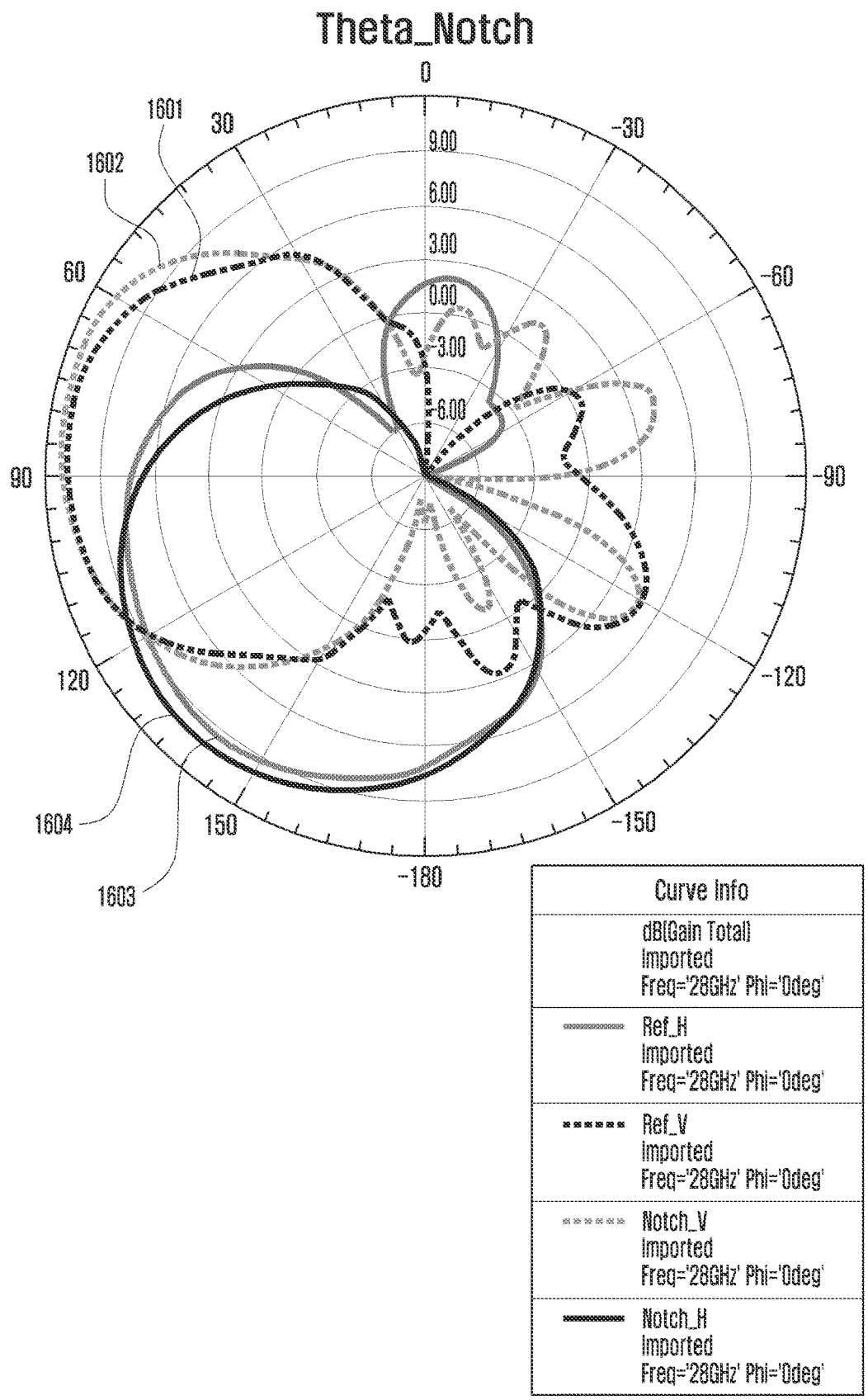
FIG. 16 is a graph showing radiation patterns by vertical polarization and horizontal polarization of an antenna module disposed in the electronic device of FIG. according to an embodiment of the disclosure.

FIG. 16 is a graph showing radiation patterns by vertical polarization (V-pol) and horizontal polarization (H-pol) of an antenna module (e.g., the antenna module 500 in FIG. 10) disposed in the electronic device of FIG. 15 according to an embodiment of the disclosure.

Referring to FIG. 16, in the antenna module (e.g., the antenna module 500 in FIG. 10), vertical polarization 1602 in case where a notch region (e.g., the notch 3012 in FIG. 15) is applied to a conductive sheet (e.g., the conductive sheet 3011 in FIG. 15) exhibits a relatively excellent sensitivity characteristic compared to vertical polarization 1601 in case where the notch region is not applied. In addition, horizontal polarization 1604 in case where the notch region is applied to the conductive sheet exhibits a relatively excellent sensitivity characteristic compared to horizontal polarization 1603 in case where the notch region is not applied.

Figure 17:
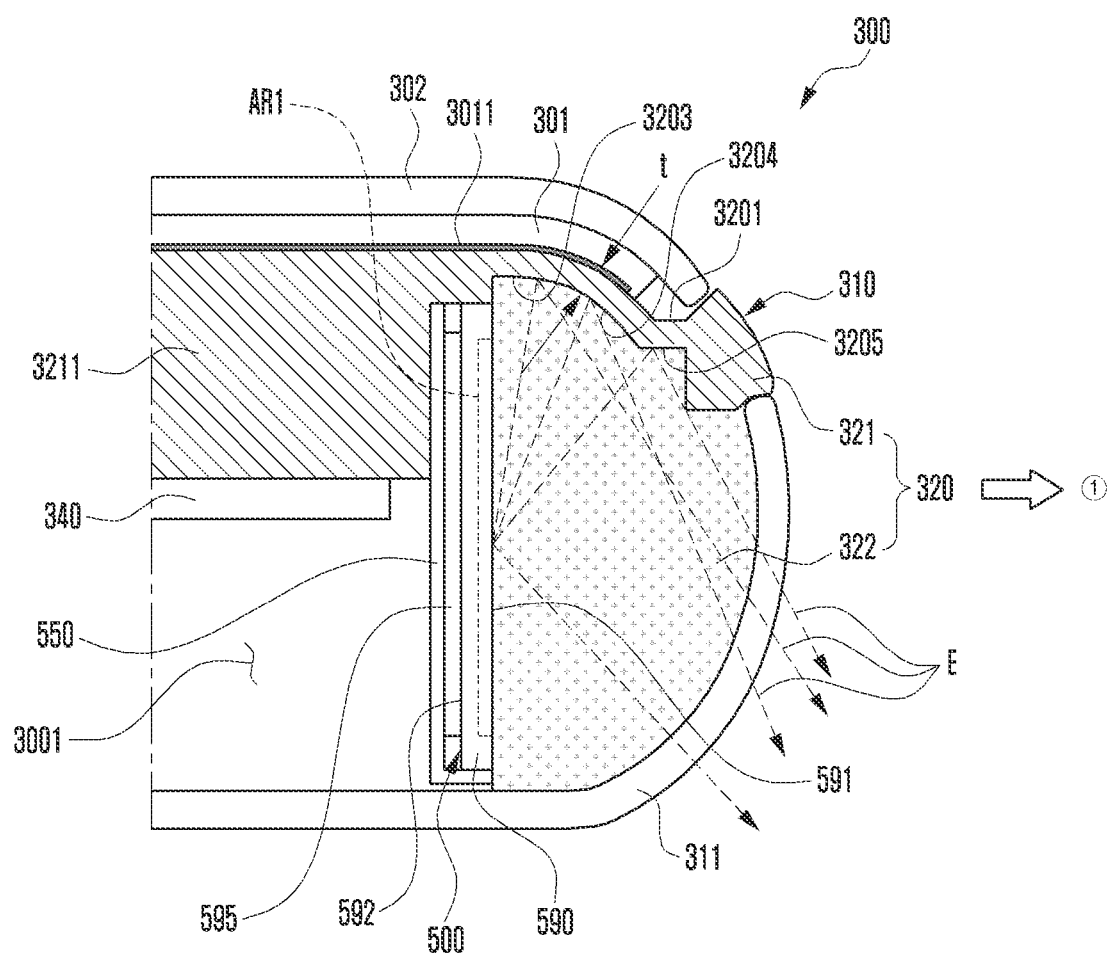
FIG. 17 is a cross-sectional view partially showing an electronic device according to an embodiment of the disclosure.

FIG. 17 is a cross-sectional view partially showing an electronic device according to an embodiment of the disclosure.

According to a certain embodiment, it is possible to prevent the performance degradation of the antenna module 500 by changing the structural shape of the inner surface of the conductive portion 321 of the lateral member 320.

Referring to FIG. 17, the electronic device 300 may include the conductive portion 321 disposed as a part of the lateral member 320 near one upper side of the antenna module 500 placed in the inner space 3001, and supporting at least in part the front plate 302 and the display 301. According to an embodiment, in the lateral member 320, a typical shape of the conductive portion 321 such as a first-stage structure (e.g., a first-stage eaves structure) or a stepped structure (e.g., a two-stage eaves structure) is changed to increase (delay with 180 degrees) or decrease a phase difference between radio waves directly radiated to the outside from the antenna module 500 and radio waves reflected by the inner surface of the conductive portion 321. As a result, it is possible to prevent the cancelation phenomenon (or null phenomenon) occurring when radio waves having different phases gather around one place.

According to various embodiments, the conductive portion 321 of the lateral member 320 may include a structural shape for not only distorting an effective direction of radio waves radiated from the antenna module 500 and reflected by the conductive portion 321, but also increasing a path length. According to an embodiment, the conductive portion 321 may include a first flat plane 3203, a curved plane 3204 extended laterally from the first flat plane 3203, and a second flat plane 3205 extended from the curved plane 3204. According to an embodiment, the first flat plane 3203 and/or the second flat plane 3205 may be formed to be substantially perpendicular to the first surface 591 of the PCB 590. In another embodiment, the first flat plane 3203 and/or the second flat plane 3205 may be formed to have various inclination angles that allow radio waves (E) radiated from the antenna module 500 and reflected by the conductive portion 321 to be scattered without gathering around one place. In still another embodiment, the curved plane 3204 may be formed to have various radii of curvature that allow the radio waves (E) radiated from the antenna module 500 and reflected by the conductive portion 321 to be scattered without gathering around one place. In yet another embodiment, the conductive portion 321 may have, at least in part, a thickness (t) adjusted to increase the path length of the radio waves (E) radiated from the antenna module 500.

Figure 18:
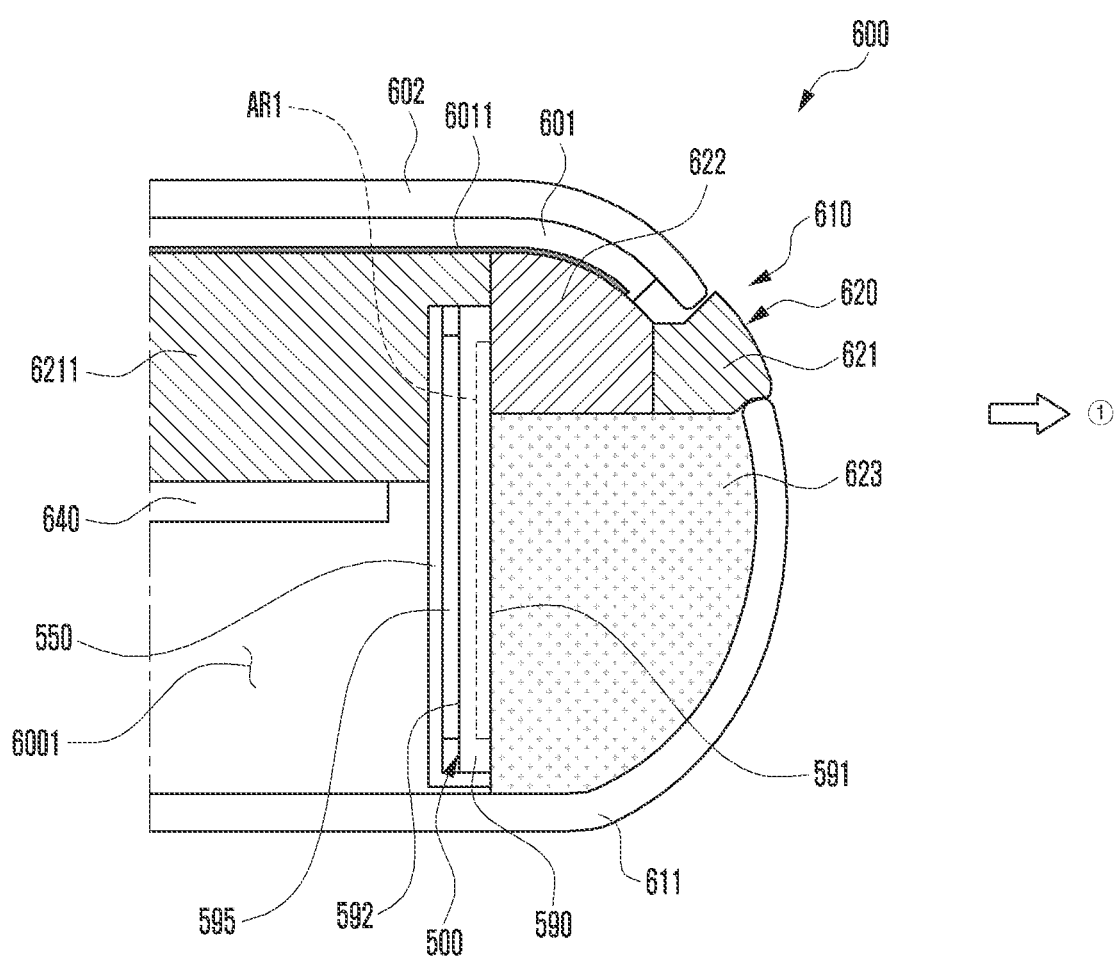
FIG. 18 is a cross-sectional view partially showing an electronic device according to an embodiment of the disclosure.

FIG. 18 is a cross-sectional view partially showing an electronic device according to an embodiment of the disclosure.

Figure 19A:
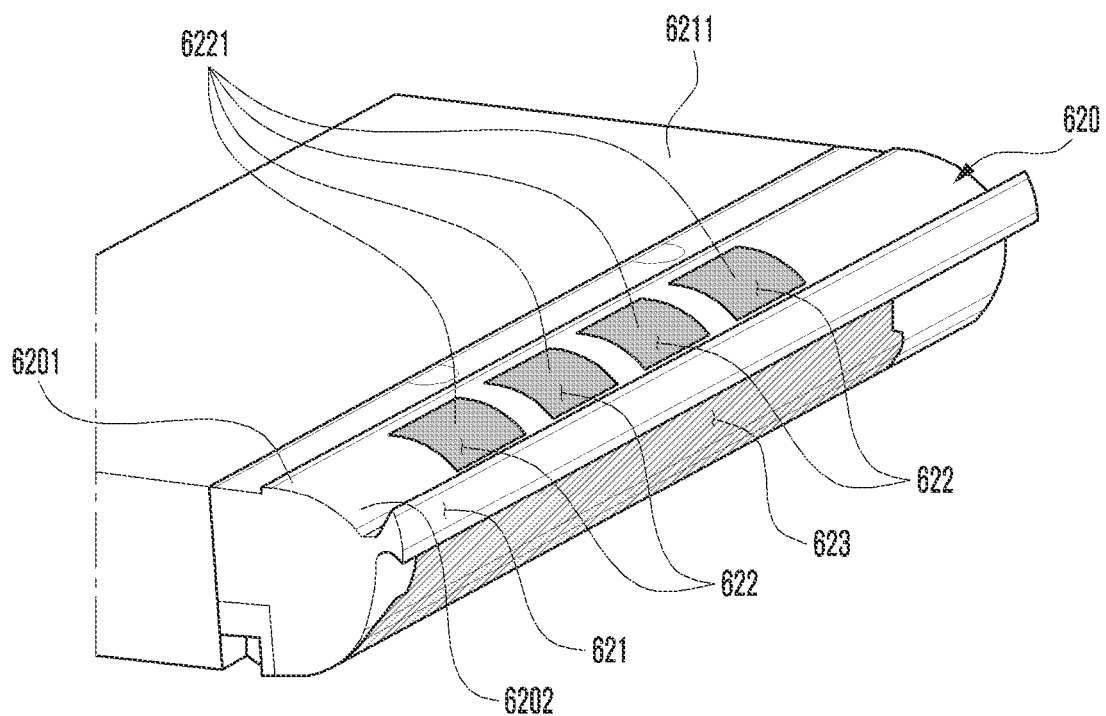
FIGS. 19A and 19B are perspective views partially showing a support member according to various embodiments of the disclosure.
Figure 19B:
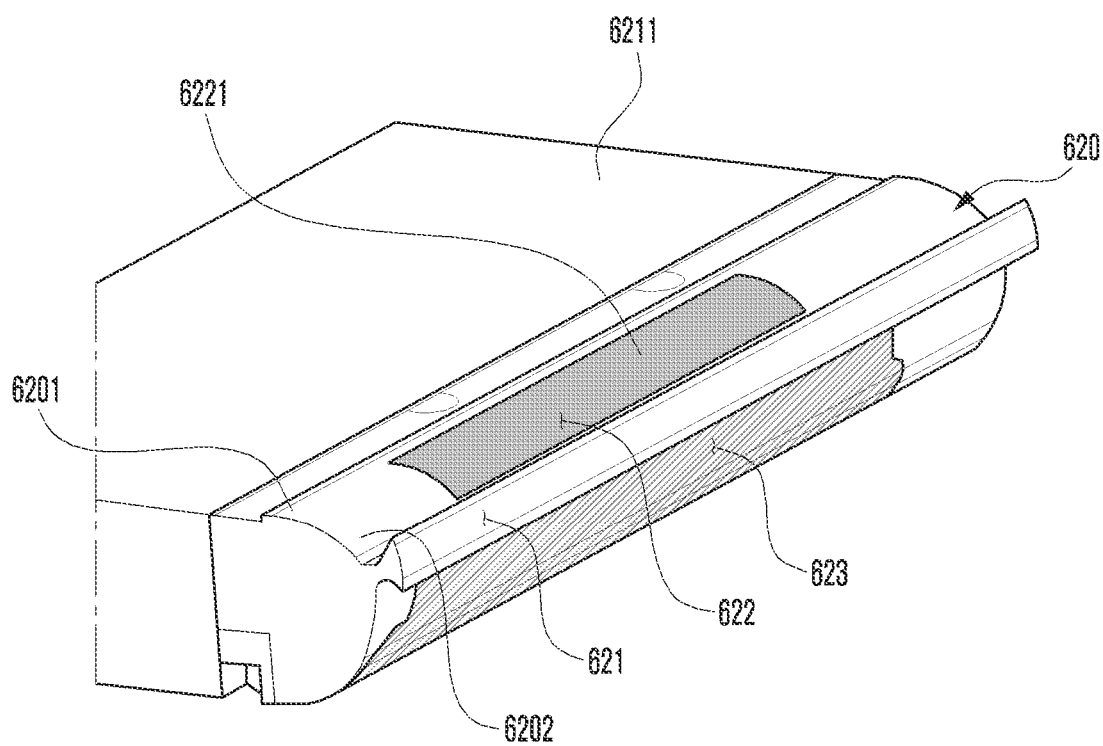

FIGS. 19A and 19B are perspective views partially showing a support member according to various embodiments of the disclosure.

An electronic device 600 of FIG. 18 may be similar, at least in part, to the electronic device 101 of FIG. 1, the electronic device 300 of FIG. 3A, or the electronic device 300 of FIG. 10, or may include other embodiments of the electronic device.

Referring to FIGS. 18 and 19A, the electronic device 600 may include a housing 610 (e.g., the housing 310 in FIG. 10) that includes a front cover 602 (e.g., the front plate 302 in FIG. 10), a rear cover 611 (e.g., the rear plate 311 in FIG. 10) facing a direction opposite to the front cover 602, and a support member 620 (e.g., the lateral member 320 in FIG. 10) surrounding an inner space 6001 between the front cover 602 and the rear cover 611. According to an embodiment, the electronic device 600 may include a device substrate 640 (e.g., the PCB 340 in FIG. 3C) disposed in the inner space 6001. According to an embodiment, the support member 620 may include a conductive first portion 621 forming a lateral appearance (e.g., the lateral surface 310c in FIG. 3A) of the electronic device 600, a second portion 622 adjacent to an array antenna AR1, the front cover 602, and the conductive first portion 621 and having at least one opening 6221 filled with a non-conductive material, and a third portion 623 formed of a non-conductive material and adjacent to the array antenna AR1, the rear cover 611, and the conductive first portion 621. According to an embodiment, the support member 620 may be disposed between the front and rear covers 602 and 611, support a display 601 of the electronic device 600, and extended toward the lateral surface of the electronic device 600 to form, at least in part, the lateral appearance (e.g., the lateral surface 310c in FIG. 3A) of the electronic device 600.

According to various embodiments, the front cover 602 may be disposed through at least parts of the conductive first portion 621 and the second portion 622 of the support member 620. According to an embodiment, the front cover 602 may be supported through an extended portion 6211 (e.g., the first support member 3211 in FIG. extended from the support member 620. According to an embodiment, the electronic device 600 may include the display 601 disposed between the front cover 602 and the support member 620 to be seen from the outside at least in part through the front cover 602. According to an embodiment, the display 601 may include a polarization layer (not shown), a display panel (not shown), at least one additional layer (e.g., a cushion layer and/or an embossing layer, not shown), and/or a conductive sheet 6011 (e.g., the conductive sheet 3011 in FIG. 10), which are stacked sequentially on the rear surface of the front cover 602. According to an embodiment, the display 601 may include the conductive sheet 6011 (e.g., a Cu sheet) disposed for noise shielding on the rear surface of the display panel.

According to various embodiments, the antenna module 500 may be disposed in a direction perpendicular to the front cover 602 in the inner space 6001 of the electronic device 600 through the conductive member 550. According to an embodiment, the antenna module 500 may be mounted such that the array antenna AR1 including conductive patches (e.g., the conductive patches 510, 520, 530, and 540 in FIG. 5A) (e.g., a plurality of antenna elements) face the support member 620. For example, the antenna module 500 may be disposed such that the first surface 591 of the PCB 590 faces the support member 620, and thus a beam pattern may be formed in a direction (denoted by ①) faced by the support member 620 of the electronic device 600.

According to various embodiments, the conductive first portion 621 and the second portion 622 of the support member 620 may be formed in a shape for supporting the display 601 and the front cover 602 near one upper side of the antenna module 500. According to an embodiment, the third portion 623 of the support member 620 may be formed in a shape for supporting the rear cover 611 near one lower side of the antenna module 500. According to an embodiment, the conductive first portion 621 may be exposed at least in part to the outside of the electronic device 600, and the second and third portions 622 and 623 may be hidden by the front and rear covers 602 and 611 so as not to be exposed to the outside. According to an embodiment, a beam formed by the array antenna AR1 may be radiated to the outside through the at least one opening 6221 and the third portion 623.

According to various embodiments, the at least one opening 6221 formed in the second portion 622 may be filled with a non-conductive material. For example, the non-conductive material of the second portion 622 and the non-conductive material of the third portion 623 may be inserted-injected together with the conductive first portion 621. In a certain embodiment, the non-conductive material of the second portion 622 and the non-conductive material of the third portion 623 may be formed of insulating materials having the same or different properties (e.g., different dielectric constants). In a certain embodiment, the non-conductive material of the second portion 622 and the non-conductive material of the third portion 623 may be connected to or spaced apart from each other in the inner space of the electronic device. In a certain embodiment, the at least one opening 6221 may be an empty space in which no insulating material is disposed. According to an embodiment, the second portion 622 may include a flat portion 6201 and a curved portion 6202 extended from the flat portion 6201 to the first portion 621. According to an embodiment, the at least one opening 6221 and/or the non-conductive material filled in the at least one opening 6221 may be formed in a shape including the flat portion 6201 and/or the curved portion 6202.

According to an embodiment, the at least one opening 6221 may be disposed at a position overlapped at least in part with the array antenna AR1 when the front cover 602 is viewed from above and/or when the support member 620 is viewed from outside. According to an embodiment, a plurality of openings 6221 may be disposed at positions corresponding to respective conductive patches (e.g., the first conductive patch 510, the second conductive patch 520, the third conductive patch 530, and/or the fourth conductive patch 540 in FIG. 5). Therefore, a beam pattern radiated from the antenna module 500 in the direction (denoted by ①) of the support member 620 is increased upward in radiation length up to the conductive sheet 6011 of the display 601 through the at least one opening 6221. This may help to reduce the cancelation phenomenon as compared to an antenna module disposed through the support member 620 having no opening 6221.

Referring to FIG. 19B, the support member 620 may include a single opening 6221 disposed to be overlapped with the array antenna AR1. According to an embodiment, the opening 6221 may be formed in a size overlapped with all of a plurality of conductive patches (e.g., the first conductive patch 510, the second conductive patch 520, the third conductive patch 530, and/or the fourth conductive patch 540 in FIG. 5) of the array antenna AR1 when the front cover 602 is viewed from above and/or when the support member 620 is viewed from outside. Although not shown, the electronic device 600 may include, as in FIG. 13, an electrical connection member (e.g., the electrical connection member 3212 in FIG. 20A) disposed between the conductive first portion 621 and the conductive sheet 6011. In addition, the radiation characteristics of the array antenna AR1 may be adjusted depending on a change in position of the conductive connection member.

Figure 20A:
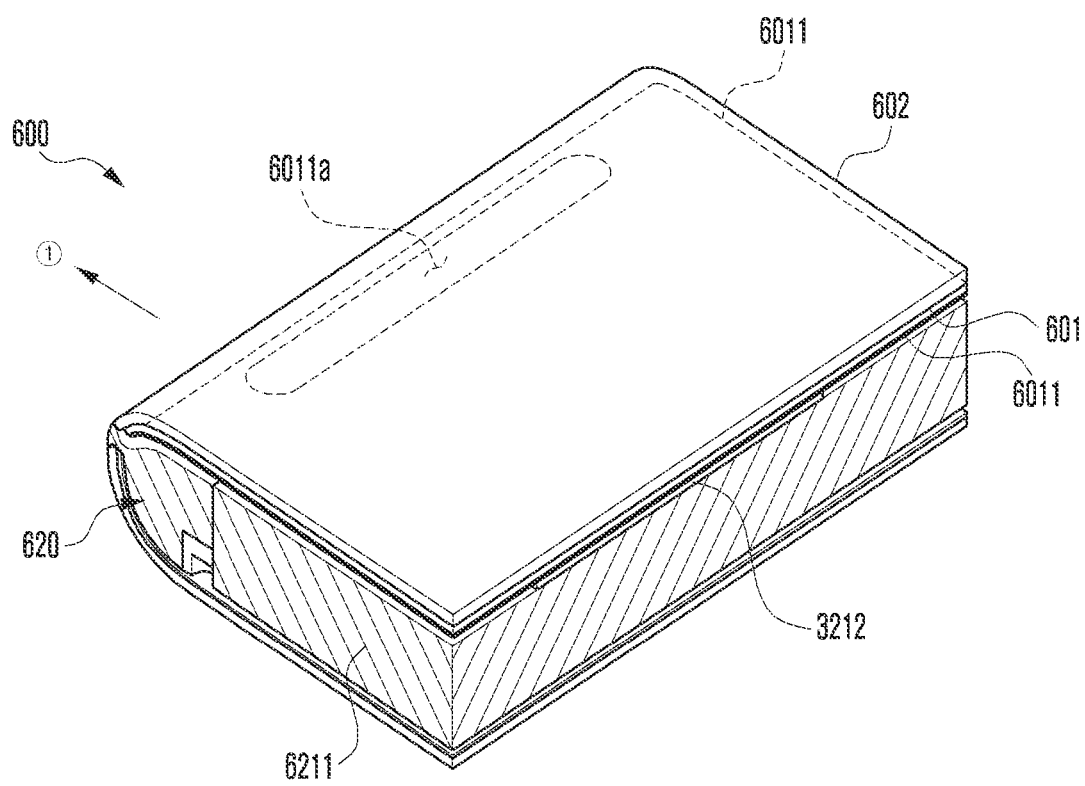
FIGS. 20A and 20B are perspective views partially showing an electronic device including a conductive sheet having a slot according to various embodiments of the disclosure.
Figure 20B:
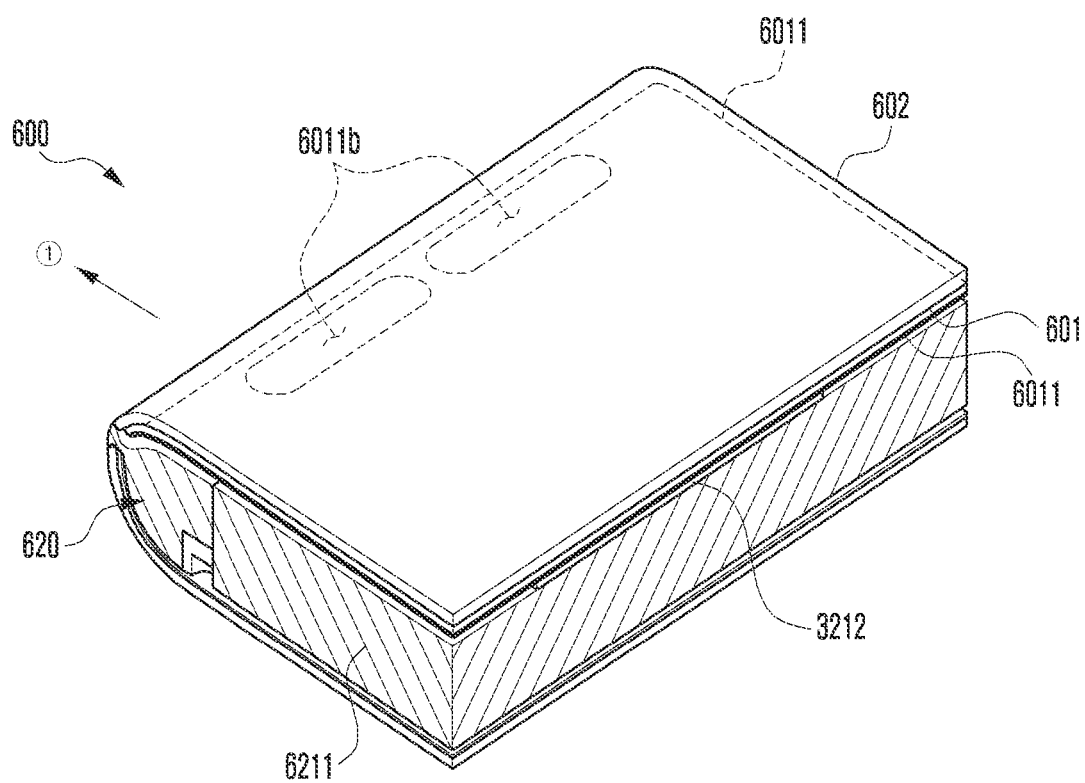

FIGS. 20A and 20B are perspective views partially showing an electronic device including a conductive sheet having a slot according to various embodiments of the disclosure.

Referring to FIGS. 20A and 20B, when the beam pattern of the array antenna AR1 is formed through the at least one opening 6221 shown in FIG. 18, the sensitivity may be degraded by the conductive sheet 6011 (e.g., a Cu sheet) disposed on the rear surface of the display 601. In order to prevent such a degradation of sensitivity, the electronic device 600 may include, for example, at least one slot 6011a or 6011b formed in at least a part of the conductive sheet 6011. According to an embodiment, the at least one slot 6011a or 6011b may be formed at a position overlapped with the at least one opening 6221 when the front cover 602 is viewed from above. For example, the at least one slot 6011a or 6011b may be one slot 6011a or two slots 6011b having a length overlapped with a plurality of antenna elements (e.g., conductive patches) of the array antenna AR1. In a certain embodiment, the at least one slot may be a plurality of slots respectively corresponding to the plurality of antenna elements.

As described above, the electronic device according to embodiments of the disclosure has the structurally modified housing for disallowing the non-conductive portion thereof to be separated from the conductive portion thereof from external impact. This may also prevent the radiation performance of the antenna from being degraded.

According to various embodiments of the disclosure, an electronic device (e.g., the electronic device 600 in FIG. 18) may include a front cover (e.g., the front cover 602 in FIG. 18), a rear cover (e.g., the rear cover 611 in FIG. 18), an array antenna (e.g., the array antenna AR1 in FIG. 18), and a support member (e.g., the support member 620 in FIG. 18). The front cover and the rear cover may form a part of an outer appearance of the electronic device. The array antenna may include a plurality of antenna elements disposed between the front cover and the rear cover. The support member may be disposed between the front cover and the rear cover, support a display (e.g., the display 601 in FIG. 18) of the electronic device, and be extended to a lateral surface of the electronic device to form at least in part a lateral appearance of the electronic device. The support member may include a conductive first portion (e.g., the conductive first portion 621 in FIG. 18) forming the lateral appearance of the electronic device, a second portion (e.g., the second portion 622 in FIG. 18) adjacent to the array antenna, the front cover, and the conductive first portion, and having at least one opening (e.g., the opening 6221 in FIG. 19A) filled with a non-conductive material, and a third portion (e.g., the third portion 623 in FIG. 18) formed of a non-conductive material and adjacent to the array antenna, the rear cover, and the conductive first portion. The first portion may be exposed to an outside of the electronic device, and the second and third portions may be hidden by the front and rear covers so as not to be exposed to the outside. A beam formed by the array antenna may be radiated to the outside through the at least one opening and the third portion.

According to various embodiments, the display may include a display panel disposed between the front cover and the rear cover and overlapped with the at least one opening, and a conductive sheet (e.g., the conductive sheet 6011 in FIG. 18) disposed on a rear surface of the display panel so as not to be overlapped with the at least one opening.

According to various embodiments, the conductive sheet may include at least one notch (e.g., the notch 3012 in FIG. 15) or at least one slot (e.g., the slot 6011a in FIG. 20A or the slots 6011b in FIG. 20B) formed in a region overlapped with the at least one opening.

According to various embodiments, the electronic device may further include a conductive connection member (e.g., the conductive connection member 3212 in FIG. 20A) disposed between the conductive sheet and the conductive first portion.

According to various embodiments, the conductive connection member may include a metal member electrically connecting the conductive first portion and the conductive sheet.

According to various embodiments, an electrical connecting position of the conductive connection member between the conductive first portion and the conductive sheet may determine radiation characteristics of the array antenna.

According to various embodiments, the conductive first portion and/or the second portion may be disposed to face the front cover, and the conductive first portion and/or the second portion may have a flat portion (e.g., the flat portion 6201 in FIG. 19A) and a curved portion (e.g., the curved portion 6202 in FIG. 19A) extended from the flat portion.

The display panel and the conductive sheet may be disposed adjacent to at least a part of the curved portion from the flat portion.

According to various embodiments, the at least one opening may be disposed at least in part in the flat portion and the curved portion.

According to various embodiments, the second portion and the third portion may be disposed at least in part to be connected to each other.

According to various embodiments, the non-conductive material of the second portion and the non-conductive material of the third portion may have same or different dielectric constants.

According to various embodiments, the at least one opening may be disposed at a position corresponding to the plurality of antenna elements.

According to various embodiments, the at least one opening may be formed in a number corresponding to a number of the antenna elements.

According to various embodiments, the plurality of antenna elements may include a plurality of conductive patches disposed at regular intervals on a printed circuit board, and the at least one opening may be formed in a size corresponding to all of the plurality of conductive patches.

According to various embodiments of the disclosure, a portable communication device (e.g., the electronic device 600 in FIG. 18) may include a housing (e.g., the housing 610 in FIG. 18), a display (e.g., the display 601 in FIG. 18), and an antenna module (e.g., the antenna module 500 in FIG. 18). The housing may include a first member (e.g., the front cover 602 in FIG. 18) forming a front portion of the portable communication device, a second member (e.g., the rear cover 611 in FIG. 18) forming a rear portion of the portable communication device, and a third member (e.g., the support member 620 in FIG. 18) forming a lateral portion of the portable communication device. The third member may include a conductive member (e.g., the conductive first portion 621 in FIG. 18) having an opening (e.g., the opening 6221 in FIG. 19A) formed therein, and a non-conductive member (e.g., the second portion 622 in FIG. 18) filled in the opening. One surface of the conductive member may be exposed to an outside of the portable communication device, and the non-conductive member may be disposed in the housing so as not to be exposed to the outside. The display may be disposed under the first member and visually seen to the outside through the first member. The antenna module may be disposed between the display and the second member and include an antenna (e.g., the array antenna AR1 in FIG. 18) and a printed circuit board (e.g., the PCB 590 in FIG. 18). The antenna may be formed on the printed circuit board such that a signal radiated from the antenna is transmitted to the outside through the non-conductive member.

According to various embodiments, the display may include a display panel and a conductive sheet (e.g., the conductive sheet 6011 in FIG. 18) disposed on a rear surface of the display panel so as not to be overlapped with the opening.

According to various embodiments, the conductive sheet may have at least one notch (e.g., the notch 3012 in FIG. 15) or at least one slot (e.g., the slot 6011a in FIG. 20A or the slots 6011b in FIG. 20B) formed in a region overlapped with the opening.

According to various embodiments, the opening may include a first sub-opening (e.g., the first opening 6221 in FIG. 19A) and a second sub-opening (e.g., the second opening 6221 disposed near the first opening in FIG. 19A) spaced apart from each other. An upper surface of the non-conductive member may include a first portion (e.g., the second portion 622 in FIG. 19A) exposed through the conductive member through the first sub-opening and a second portion (e.g., the second portion 622 in FIG. 19A) exposed through the conductive member through the second sub-opening.

According to various embodiments, the antenna may include a first antenna (e.g., the first conductive patch 510 in FIG. 5) and a second antenna (e.g., the second conductive patch 520 in FIG. 5) spaced from each other. The first portion may be overlapped with the first antenna when viewed in a direction substantially perpendicular to the first portion of the upper surface, and the second portion may be overlapped with the second antenna when viewed in a direction substantially perpendicular to the second portion of the upper surface.

According to various embodiments, the conductive member (e.g., the conductive first portion 621 in FIG. 19A) may be overlapped with the antenna when viewed in a direction substantially perpendicular to a surface of the printed circuit board facing the lateral portion.

According to various embodiments, the conductive member may be extended into the housing to support a lower surface of the antenna module (e.g., the PCB 590 including the array antenna AR1 in FIG. 18).

While the disclosure has been particularly shown and described with reference to various embodiments thereof, it will be understood by those skilled in the art that various changes in form and details may be made therein without departing from the scope of the subject matter as defined by the appended claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
    a housing comprising a rear cover and a lateral member forming a rear surface and a lateral surface of the portable communication device, respectively; and
    an antenna structure disposed along a portion of the lateral surface such that the antenna structure is configured to radiate a radio signal through the lateral surface,
    wherein the lateral member comprises a non-conductive portion extended along the lateral surface as covering an entire length of the antenna structure,
    wherein the lateral member further comprises a conductive portion having a concave surface facing a first ending portion of the non-conducive portion in a length direction thereof,
    wherein the concave surface is in contact with the non-conductive portion at a position not overlapped with the antenna structure when the lateral surface is viewed from an outside of the portable communication device, and
    wherein a region of the non-conductive portion facing the concave surface is positioned near one of right or left ends of the antenna structure when the lateral surface is viewed from the outside of the portable communication device.

2. The portable communication device of claim 1, wherein the non-conductive portion is disposed substantially between the conductive portion and the antenna structure.

3. The portable communication device of claim 1, wherein the lateral member further includes another conductive portion having a concave surface facing another ending portion of the non-conductive portion opposite to the first ending portion.

4. The portable communication device of claim 3, wherein a distance (D1) between the concave surface of the conductive portion and the concave surface of the other conductive portion is longer than a length (D2) of the antenna surface.

5. The portable communication device of claim 1, further comprising:
    a front cover;
    a display comprising:
        a display panel disposed between the front cover and the rear cover and overlapping at least one opening; and
    a conductive sheet disposed on a rear surface of the display panel so as not to overlap the at least one opening.

6. The portable communication device of claim 5, wherein the conductive sheet comprises at least one notch or slot, the at least one notch or slot being formed in a region overlapping the at least one opening.

7. The portable communication device of claim 5, further comprising a conductive connection member disposed between the conductive sheet and the conductive portion.

8. The portable communication device of claim 7, wherein the conductive connection member comprises a metal member configured to electrically connect the conductive portion and the conductive sheet.

9. The portable communication device of claim 7, wherein the conductive connection member further comprises an electrical connecting position disposed between the conductive portion and the conductive sheet and configured to determine radiation characteristics of the antenna structure.

10. An electronic device comprising:
    a front cover and a rear cover forming a part of an outer appearance of the electronic device;
    an antenna structure comprising a plurality of antenna elements disposed between the front cover and the rear cover; and
    a support member disposed between the front cover and the rear cover,
    wherein the rear cover and a lateral member forming a rear surface and a lateral surface of the electronic device, respectively,
    wherein the antenna structure is disposed along a portion of the lateral surface such that the antenna structure is configured to radiate a radio signal through the lateral surface,
    wherein the lateral member comprises a non-conductive portion extends along the lateral surface as covering an entire length of the antenna structure,
    wherein the lateral member further comprises a conductive portion having a concave surface facing a first ending portion of the non-conducive portion in a length direction thereof,
    wherein the concave surface is in contact with the non-conductive portion at a position not overlapped with the antenna structure when the lateral surface is viewed from an outside of the electronic device, and
    wherein a region of the non-conductive portion facing the concave surface is positioned near one of right or left ends of the antenna structure when the lateral surface is viewed from the outside of the electronic device.

11. The electronic device of claim 10, wherein the non-conductive portion is disposed substantially between the conductive portion and the antenna structure.

12. The electronic device of claim 10, wherein the lateral member further includes another conductive portion having a concave surface facing another ending portion of the non-conductive portion opposite to the first ending portion.

13. The electronic device of claim 12, wherein a distance (D1) between the concave surface of the conductive portion and the concave surface of the other conductive portion is longer than a length (D2) of the antenna surface.

14. The electronic device of claim 10, further comprising:
a front cover;
a display comprising:
a display panel disposed between the front cover and the rear cover and overlapping at least one opening; and
a conductive sheet disposed on a rear surface of the display panel so as not to overlap the at least one opening.

15. The electronic device of claim 14, wherein the conductive sheet comprises at least one notch or slot, the at least one notch or slot being formed in a region overlapping the at least one opening.

16. The electronic device of claim 14, wherein the electronic device further comprises a conductive connection member disposed between the conductive sheet and the conductive portion.

17. The electronic device of claim 16, wherein the conductive connection member comprises a metal member configured to electrically connect the conductive portion and the conductive sheet.

18. The electronic device of claim 16, wherein the conductive connection member further comprises an electrical connecting position disposed between the conductive portion and the conductive sheet and configured to determine radiation characteristics of the antenna structure.

19. A portable communication device comprising:
a housing comprising a rear cover and a lateral member forming a rear surface and a lateral surface of the portable communication device, respectively; and
an antenna structure disposed along a portion of the lateral surface such that an antenna surface of the antenna structure via which a radio signal is radiated faces the portion of the lateral surface,
wherein the lateral member comprises a non-conductive portion extended along the lateral surface as covering an entire length of the antenna structure,
wherein the lateral member further comprises a conductive portion having a concave surface facing a first ending portion of the non-conducive portion in a length direction thereof,
wherein the concave surface is in contact with the non-conductive portion at a position not overlapped with the antenna structure when the lateral surface is viewed from an outside of the portable communication device, and
wherein one of the antenna structure's lengthwise edges faces the lateral member and the non-conductive portion.

* * * * *